United States Patent [19]
Machtig et al.

[11] Patent Number: 6,042,235
[45] Date of Patent: Mar. 28, 2000

[54] VIDEOCONFERENCING EYE CONTACT SPATIAL IMAGING DISPLAY

[75] Inventors: Jeffrey Machtig, Lake Forest; Steve McNelley, San Juan Capistrano, both of Calif.

[73] Assignee: Videotronic Systems, San Juan Capistrano, Calif.

[21] Appl. No.: 09/119,714

[22] Filed: Jul. 20, 1998

Related U.S. Application Data

[63] Continuation-in-part of application No. 08/748,499, Nov. 8, 1996, Pat. No. 5,782,547.

[51] Int. Cl.[7] .................................................. G03B 21/14
[52] U.S. Cl. ............................................... 353/28; 348/13
[58] Field of Search ........................ 353/10, 28; 359/478, 359/479; 348/13, 15, 14, 20

[56] References Cited

U.S. PATENT DOCUMENTS

| | | | |
|---|---|---|---|
| 4,671,625 | 6/1987 | Noble | 359/478 |
| 4,928,301 | 5/1990 | Smoot. | |
| 5,194,955 | 3/1993 | Yoneta et al. . | |
| 5,406,323 | 4/1995 | Yanigaki et al. | 348/15 |
| 5,619,254 | 4/1997 | McNelley | 359/460 |
| 5,639,151 | 6/1997 | McNelley et al. | 353/10 |
| 5,777,665 | 6/1998 | McNelley et al. | 348/20 |
| 5,782,547 | 7/1998 | Machtig et al. | 353/10 |
| 5,801,758 | 9/1998 | Heirich | 348/14 |

Primary Examiner—William Dowling
Attorney, Agent, or Firm—Stefan J. Kirchanski, Esq.; Graham & James LLP

[57] ABSTRACT

An improved transmissive spatial object display provides a background image that appears to observers to have 3-D depth and includes the added advantages of permitting several viewers to observe the display simultaneously so that the background image appears on an accessible screen like that of televisions and computer monitors. A background image display is observed directly through a first Fresnel lens of a two Fresnel lens transmissive spatial object display which lens magnifies the background image display and also provides the front screen of the device. A first partially transparent mirror at 45 degrees separates the two Fresnel lenses permitting the background image display to be viewed solely through the first Fresnel lens. The first Fresnel lens serves the dual function of creating a first spatial object (in combination with the second Fresnel lens) and magnifying the background image. The magnified background image appears through the first Fresnel lens creating a pseudo 3-D appearance even though the background image is generated by a 2-dimensional display such as a CRT. Video production techniques can enhance this illusion of dimensionality through isolation of objects and graphics on a black field and use of dimensionalizing techniques such as reflections and shadings. Alternate embodiments provide projection of multiple spatial objects. Additional embodiments are configured without the second Fresnel lens so that the first Fresnel lens serves to magnify the background display's image and by itself creates the first spatial object.

23 Claims, 12 Drawing Sheets

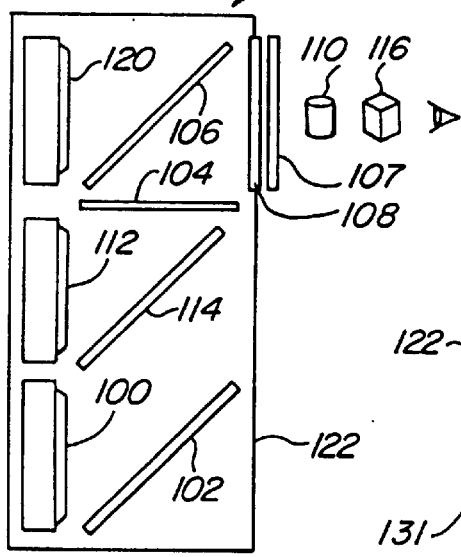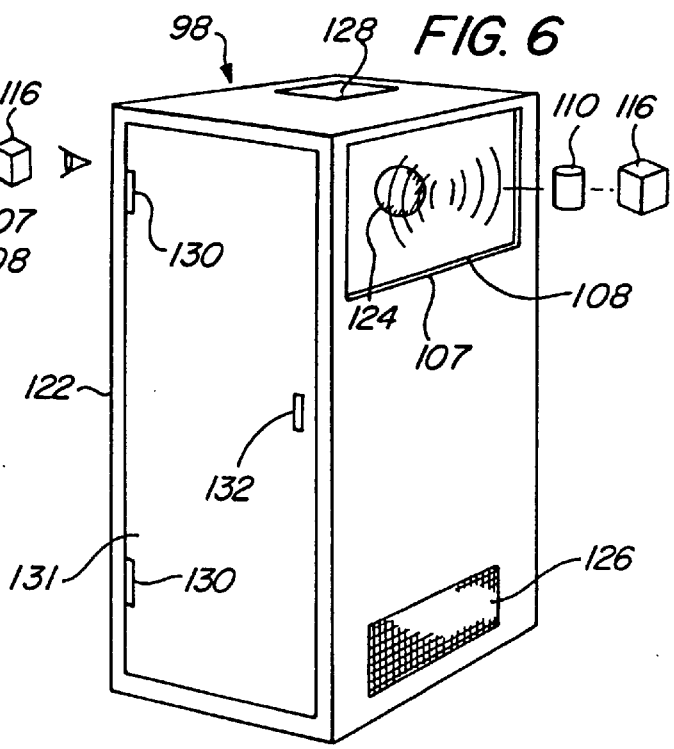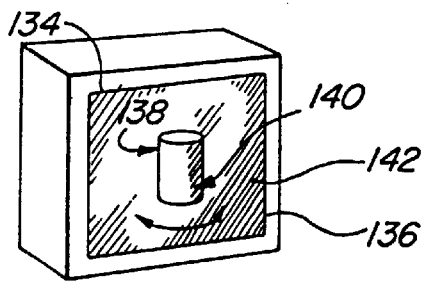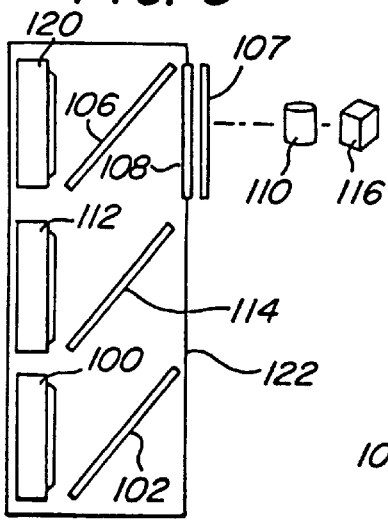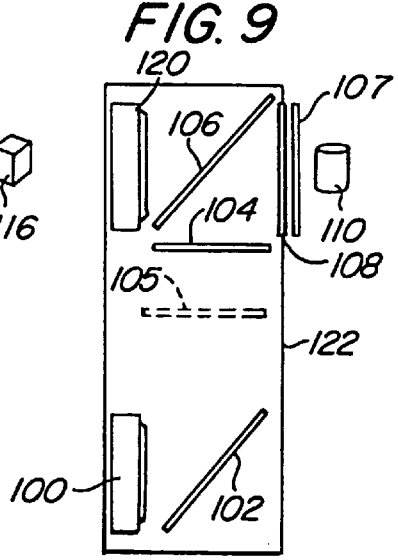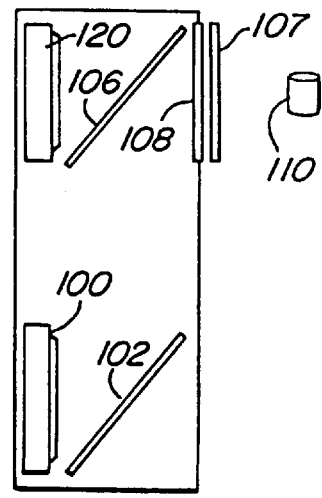

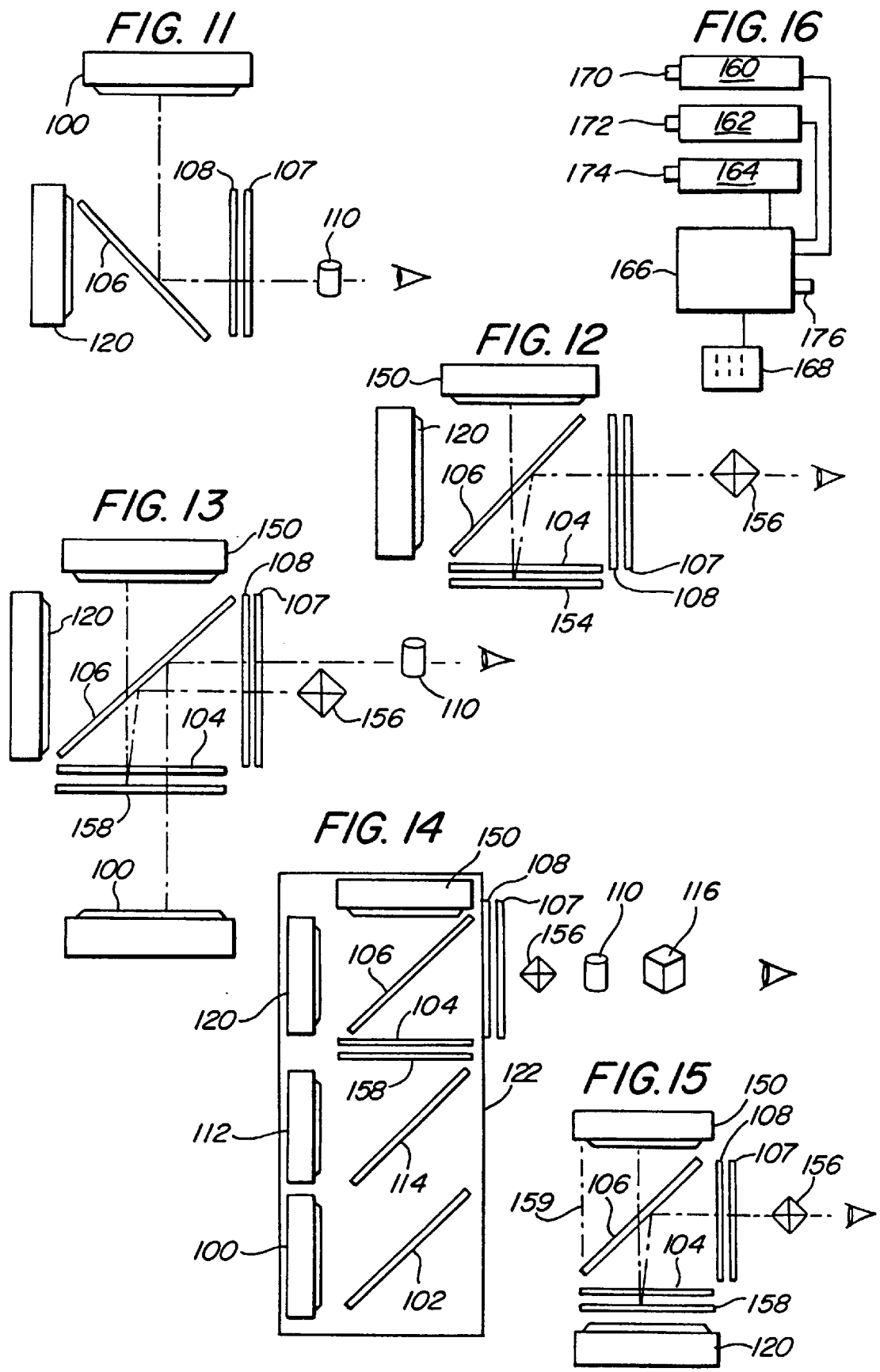

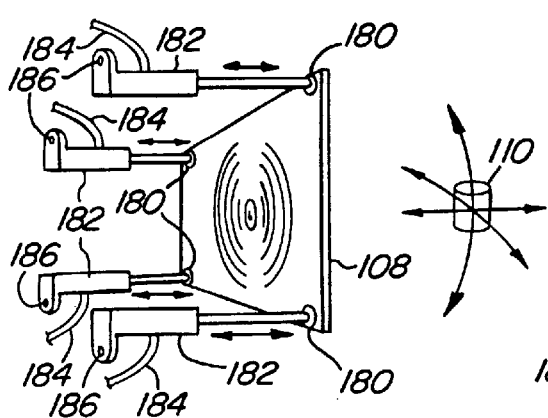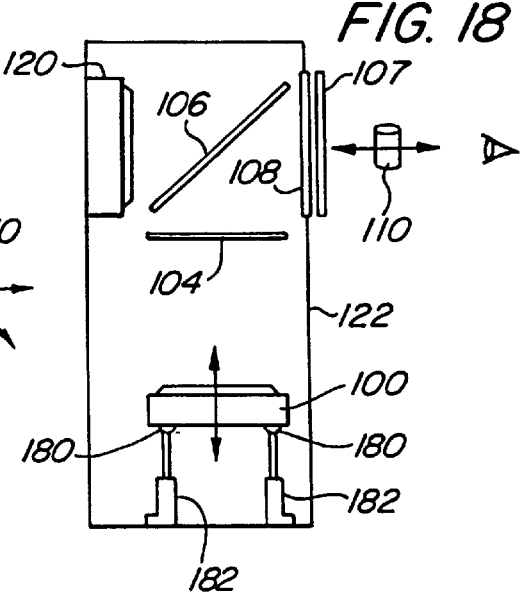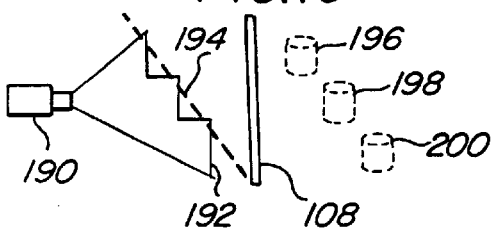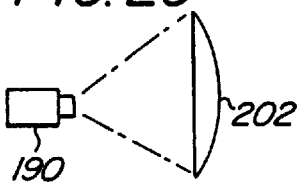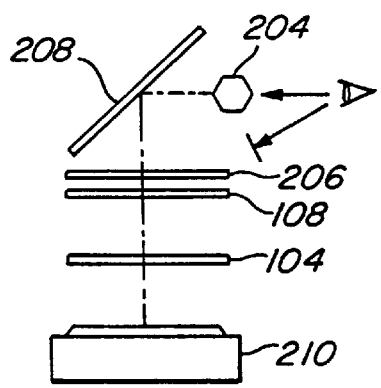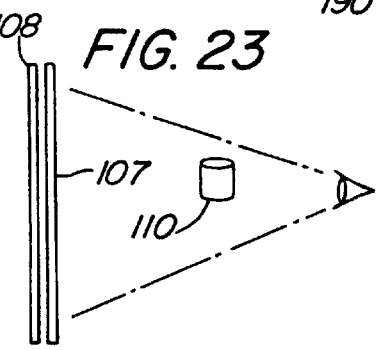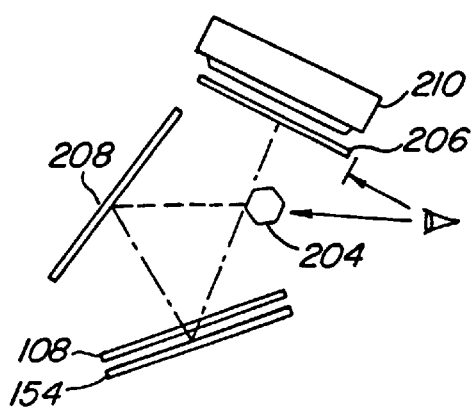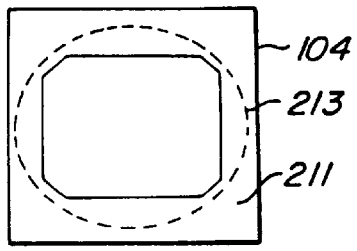

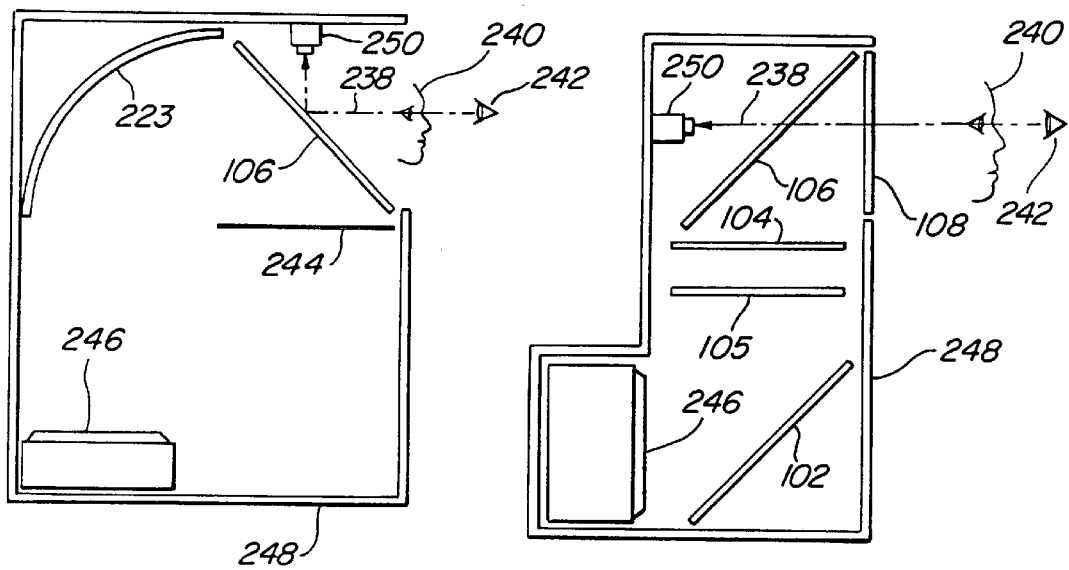
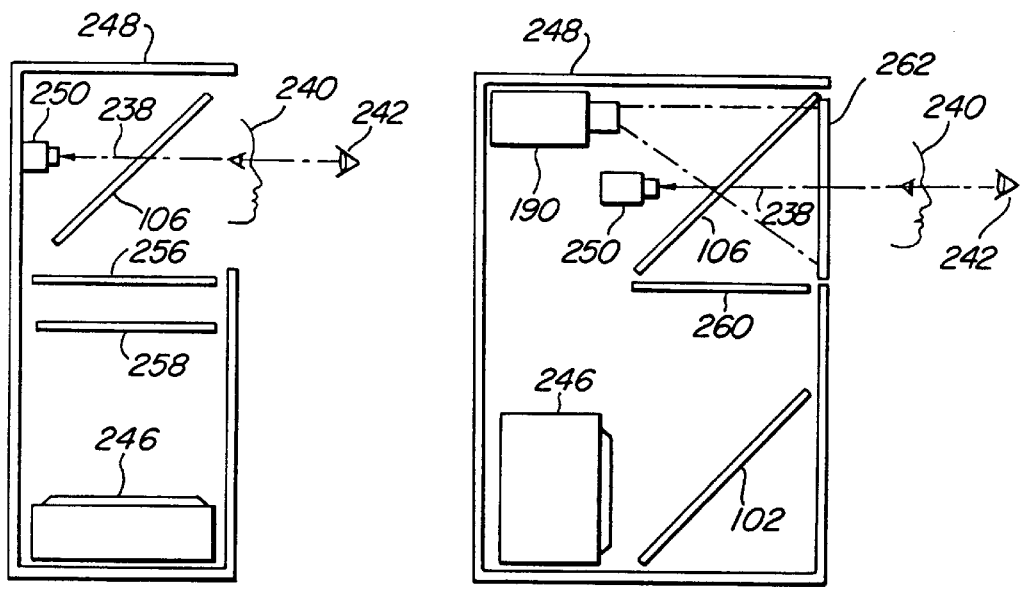
FIG. 28   FIG. 30
FIG. 29   FIG. 31

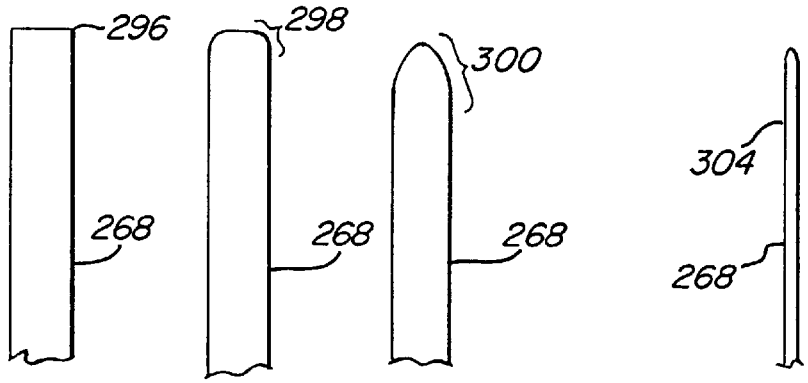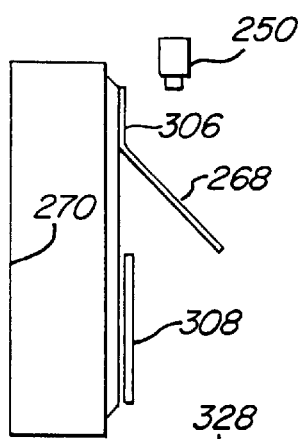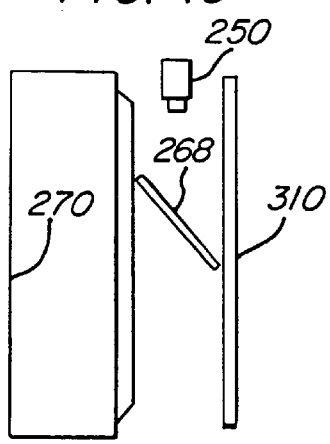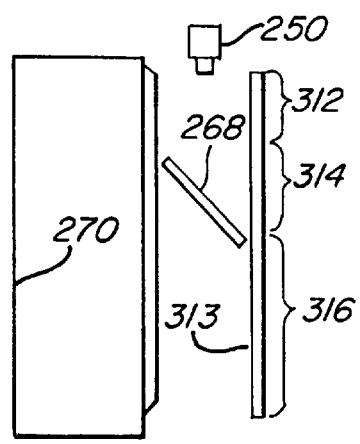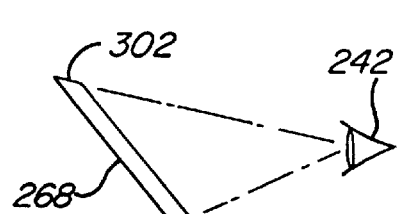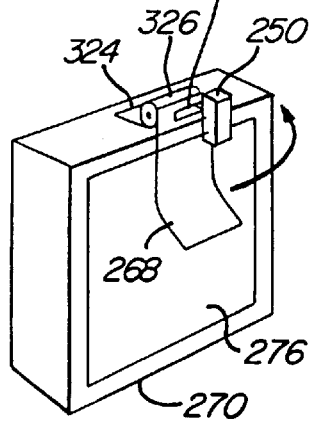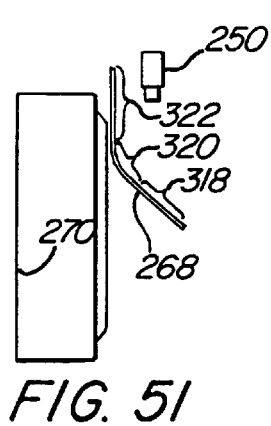

VIDEOCONFERENCING EYE CONTACT SPATIAL IMAGING DISPLAY

The present application is a Continuation In Part of application Ser. No. 08/748,499, filed on Nov. 8, 1996, and now issued as U.S. Pat. No. 5,782,547 which is hereby incorporated by reference into this application.

BACKGROUND OF THE INVENTION

1. Field of the Invention

The present invention pertains to optical display devices that produce spatial objects, i.e., natural appearing objects that float in space and three-dimensional (3-D) objects and, more specifically, pertains to a spatial object display that combines a background image or image plane with multiple foreground spatial objects.

2. Description of Related Art

Optical display devices that image an object seemingly floating in space have been well known since at least the turn of this century. The two most common methods of producing floating objects has been by either reflecting an object from one or more curved mirrors (i.e., parabolic) or viewing an object properly positioned behind one or more lenses. These methodologies are termed reflective or transmissive spatial object devices, respectively. In recent decades there has been a focus on improving particular aspects of these well-known illusions. Recently there has been interest in providing a background image to appear behind the spatial objects.

One means of providing a background image spatial object display is taught by Monroe (U.S. Pat. No. 5,257,130). In this disclosure a scrim is used to permit a spatial object (produced by either reflective or transmissive means) to appear in front of the scrim (the optical rays forming the object having passed through the open mesh weave of the scrim), while the scrim simultaneously serves as a front projection screen surface on which the background image can be projected. As seen in Prior Art FIG. 1, this device comprises a reflective spatial object display with a first concave mirror 8 and a second concave mirror 10. A reflective display 2 produces reflective spatial object image 4 which, when reflected, produces reflected spatial object 6. A scrim 14 allows the reflected spatial object 6 to pass through, but also serves as a front projection screen for displaying images from projector 12. This device is generally limited to low ambient light environments because of the tendency for bright light to wash out the image projected on the scrim 14. Further, the projector is ideally positioned in the approximate area occupied by the observers. These limitations renders the device unusable in most advertising and presentational environments such as a store front window. Also, the brightness and sharpness of the spatial object is reduced because it must be viewed through the light-absorbing scrim. Furthermore, the scrim does not allow enhanced depth to its front projected imagery.

Warren et al. (U.S. Pat. No. 5,311,357) discloses the use of two concave mirrors to produce a spatial object with one of the concave mirrors being partially transparent. Behind this partially transparent mirror is an image display which can be readily seen by an observer through the partially transparent concave mirror. As shown in Prior Art FIG. 2, the device uses a reflective real spatial object 26 created from an actual object 20 which is illuminated by a light 20 shielded by a shield 30. Here one of the concave mirrors is a partially transparent concave mirror 24 which allows an observer to view a background large screen display 28.

Although this device does provide a spatial object floating before a background image, it suffers from several disadvantages. First, the partially transparent concave mirror is an excessively expensive custom optical component. Second, the curve of the partially transparent concave mirror visibly distorts the background image. Third, the background image, on a large screen display, is positioned far back into the device, creating the awkward necessity of peering into a black box. Finally, this device does not provide a means to enhance the 3-D appearance of the background image so that the background image always appears flat. If the background image were to appear to have depth, the appearance of spatial object would be complemented resulting in high impact presentations.

Still another background image spatial object display is taught by Noble (U.S. Pat. No. 4,671,625). This transmissive spatial object display utilizes a combination of convex lenses with improved viewing of the spatial object provided by a visible reference around the area in which the spatial object appears to serve as a visual cue for the observer. This visible reference is taught primarily as the edge of a box (i.e., shroud) that extends out from the closest convex lens to the observer. A background image is provided by reflecting the spatial object off a partially transparent mirror with the image behind in an optical arrangement similar to Warren, except that this partially transparent mirror is flat and is not used to create the spatial object.

This device is illustrated in Prior Art FIG. 3, where a transmissive spatial object 46 created by a transmissive spatial object image 44 is produced on a transmissive spatial object display (i.e., CRT) 42. A first convex lens 50 and a second convex lens 48 manipulate the light rays to produce the transmissive spatial object 46. The transmissive spatial object 46 is viewed from as the reflection of a partially transparent mirror 52. This mirror 52 folds the beam of the transmissive spatial object 46 and allows a background image 52 (i.e., a poster or full motion display) to appear behind the partially transparent mirror 52. The edges 56 of an aperture in a housing 40 serve as a "visible reference" forming a transparent plane 57 that enables the observer to comprehend the spatial position of the transmissive spatial object 46.

As a result, the transmissive spatial object 46 appears to float within the housing 40 and does not protrude beyond the visible reference of the housing opening edges 56, where it would create a much greater visual impact. This device also suffers from the same drawback as Warren in that the observer must peer into a box to observe the background image. This problem is exacerbated by the addition of the box extension which projects out to the point in space where the spatial object appears so that the box edge can serve as the "visible reference." This visible reference operates in conjunction with an optional second visible reference (not shown) located near the convex lens to assist the viewer in accurately aligning the object in space. Unfortunately, peering deep into this box to view the image is somewhat unnatural and may be an irritant to observers accustomed to interacting directly with a television screen or a computer monitor. Also, by recessing the image deep within a box, only a single observer at a time can peer into the box to view the image. As a result, this device is unable to communicate simultaneously with multiple observers. The disclosure also fails to teach a method for providing a unique 3-D appearance to the background image that can complement the 3-D appearance of the spatial object.

Noble also discloses the combining of two spatial objects by aligning two full sets of convex lens (4 lenses in total)

with a single partially transparent mirror. Prior art FIG. 4 illustrates the same device of FIG. 3, except that the background image is replaced with a second transmissive spatial object optical arrangement. This arrangement consists of a second transmissive spatial object display 60 imaging a second transmissive spatial object image 62, with a third convex lens 66 and a fourth convex lens 68 separated by a fully reflective mirror 70 producing a second transmissive spatial object 64. It is important to note that the first convex lens 50 and the second convex lens 48 are positioned closer together to ensure the transmissive spatial object 46 remains inside the housing 40. This device suffers from the fact that both transmissive spatial objects 64 and 46 are contained inside the housing 40, at or behind the "visible reference" housing opening edges 56, rather than preferably extending beyond the housing 40 for dramatic spatial object effects.

Noble does not, however, teach how to provide a background image behind these two spatial objects, nor does he offer a method of reducing the bulk of the display necessitated by two full sets of optics. Nor does he teach a method for reducing reflections on the first convex lens, other than the shroud. Also, the configuration he teaches requires both spatial objects to be contained within the box behind the edges of the box forming the transparent plane of the visible reference means. Noble does teach that the most important application of his invention is for the spatial object to optically interact with the background image or with an additional spatial object. Such interaction requires multilayered coordinated video production techniques that are well known in the art and are commonly used for creating special effects in motion pictures in the form of multilayer Pepper's ghost images.

Finally, it is well known in the art and pertinent to this application that the Pepper's ghost illusion can produce a floating object. Typically a real object is reflected by a partially-reflective mirror that also allows a background scene to show through. From the perspective of a viewer, the mirror is invisible and the reflected image appears as a transparent "ghost" superimposed over the background scene. If the reflected object is three-dimensional, the superimposed image will also appear three-dimensional. If the image source is a two-dimensional display, the superimposed image will appear flat.

Over the years many special effect technicians have produced motion picture and video effects involving real objects with the addition of high contrast lighting, shiny surfaces, etc. to enhance the three-dimensional appearance of the superimposed image. Similar "dimensionalizing" techniques have been applied in computer animations in the form of "rendering" software. Yet, despite all these efforts, when the display source is two-dimensional, such as a CRT, even the best object productions appear flat when reflected by a partially reflective mirror. Further, when the semireflective mirror is used in a display device, an observer can readily discern the perimeter of the mirror and readily realizes that the "floating object" is merely a simple trick reflection.

OBJECTS AND SUMMARY OF THE INVENTION

Given the prior art, there still remains a need for a spatial object device that can produce a spatial object with a background image that will not be washed out by ambient light nor is awkwardly recessed at the rear of a box, thereby requiring the observer to peer deep within. Clearly, there remains a definite need for spatial object display with a background image that is viewable by several observers simultaneously. It is also desirable that this spatial object display have a screen surface similar to a television screen or computer monitor screen that is at the front of the display and that is configured to minimize ambient reflections and glare upon that screen. Also, all of the prior art background images appear flat and two-dimensional with no indication of depth. Hence, it is highly desirable to have a background image with its own unique quality of 3-D or pseudo 3-D appearance that will complement the spatial object and allow more dramatic presentations. There is also a need for this same device to allow not just one spatial object, but several layers of spatial objects interacting in concert with one another. Lastly, there is a need for this device to be contained in a display housing that is compact and can be used for entertaining video games, advertising kiosks, among numerous other uses.

It is an object of the present invention to provide a simple Fresnel lens-based spatial object display in which spatial objects appear to float in front of a background image with no housing or reference frames surrounding the spatial objects;

It is a additional object of the present invention to provide multiple spatial objects seeming to float in different planes in front of a background image;

It is a further object of the present invention to provide means to imbue the background image with a pseudo 3-D appearance;

It is a still further object of the present invention to provide a spatial image display without an opaque shroud that is still immune to effects of ambient room light;

It is another object of this invention to synchronize the background image and the spatial objects together in order to produce synergistic visual effects;

It another object of this invention to provide means to make the background image and the spatial objects interactive with one or more observers;

It is another object of the present invention to provide an eye contact teleconferencing terminal that creates a spatially imaged conferee;

It is another object of the present invention to provide an eye contact teleconferencing terminal with an image that appears behind a spatially imaged conferee;

It is another object of the present invention to provide an eye contact teleconferencing beamsplitter that is substantially reduced in its protrusion from a display; and Lastly, it is another embodiment of the present invention to enable eye contact between conferees within an extended field of view.

The above objects, in light of the limitations of the prior art, are overcome by a transmissive spatial object display that has a background image that appears to observers to have 3-D depth and includes the added advantages of permitting several viewers to observe it simultaneously so that the background image appears to have an accessible screen like that of televisions and computer monitors. This is achieved by a background image display being observed directly through a first Fresnel lens of a two Fresnel lens transmissive spatial object display. A first partially transparent mirror at 45 degrees separates the two Fresnel lenses, permitting the background image display to be positioned behind only the first Fresnel lens. In accordance with this invention, Fresnel lenses are preferred for their economy and compactness. A first Fresnel lens serves the dual function of creating a first spatial object (in combination with a second Fresnel lens) and magnifying the background image. When an observer looks through the first Fresnel lens, the magnified background image appears just behind creating a pseudo 3-D depth, even though the background image is generated by a two-dimensional display such as a CRT. This optical illusion is the result of the Fresnel lens magnifying the background image with the associated curved distortion typical when observing objects through a magnifying glass. Also, the background image appears to be larger than the enclosing display which further enhances the 3-D effect. Video production techniques, including computer animation, that isolate objects and graphics on a black field are enhanced with dimensionalizing techniques such as reflections, shadings, and movements so that the 3-D appearance of the background image becomes a fully convincing illusion. The black field is important so that the perimeter of the display is not clearly definable, allowing background objects to float in space with no defined boundary. The first Fresnel lens serves as well as a screen surface such as a screen of a television, adding to the sense of accessibility familiar to observers.

In a second embodiment a second spatial object is added. This second spatial object utilizes the same first and second Fresnel lenses as the first spatial object for economy and reduction of bulk. This is achieved by adding the second spatial object to the optical path of the first spatial object by use of a second partially transparent mirror positioned between the second spatial object display and the Fresnel lenses used for projecting the spatial objects. The second spatial object is preferably positioned in space at a plane other than the first spatial object to create another layer of depth.

An additional embodiment of the invention is configured without a second Fresnel lens. With this embodiment the first Fresnel lens serves to magnify the background display's image and alone serves to create the first spatial object. In addition, the use of only one Fresnel is configurable to produce a second spatial object by introducing a partially transparent mirror into the optical path of the first spatial object so as to reflect the image of a second spatial object display.

Other unique aspects of the present invention are elaborated upon in the detailed description of the preferred embodiments in companion with the drawings.

An additional embodiment of the present invention is to spatially image a teleconferencing conferee. To do so, a camera is hidden behind the actual spatially imaged conferee so that an eye contact image can be captured of the observer looking at the spatially imaged conferee. Also, background image optical pathways are deployed to greatly enhance the presentational capabilities of the eye contact terminal, as well as a unique eye contact beamsplitter that protrudes minimally from the display and thereby reducing the overall bulk of terminal.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 5 illustrates the an embodiment of the present invention with a magnified background image and two spatial objects created by two Fresnel lenses wherein the background image is magnified by one of the Fresnel lenses;

FIG. 6 illustrates a perspective drawing of the device of FIG. 5 as it would appear to an observer;

FIG. 7 illustrates a spatial object as it would appear on its source display;

FIG. 8 illustrates a magnified background image with two spatial objects, all of which utilize a single Fresnel lens;

FIG. 9 illustrates a magnified background image with one spatial object created by two Fresnel lenses with the background image magnified by one of the Fresnel lenses;

FIG. 10 illustrates a magnified background image display with one spatial object both of which utilize a single Fresnel lens;

FIG. 11 illustrates a variation of the device of FIG. 10 without a fully reflective mirror;

FIG. 12 illustrates a magnified background image display in which the spatial object image both passes through and is reflected by a partially transparent mirror;

FIG. 13 illustrates the same device as FIG. 12 with an additional partially transparent mirror enabling a second spatial object to be produced;

FIG. 14 illustrates the device of FIG. 13 including a third spatial object;

FIG. 15 illustrates a unique housing reduction method that positions the background image display opposite the display that produces the spatial object;

FIG. 16 illustrates a block diagram for image synchronization and interactive network connection of a spatial image display of the present invention;

FIG. 17 illustrates a mechanical method to manipulate a spatial object;

FIG. 18 illustrates a mechanical method to manipulate a spatial object by robotic positioning of a display;

FIG. 19 illustrates a screen that permits a spatial object to float at various positions;

FIG. 20 illustrates a three-dimensional shape screen that permits various positioning of a spatial object as well as real 3-D enhancement;

FIG. 21 illustrates a transmissive spatial object display with a black mirror for improved spatial object viewing;

FIG. 22 illustrates a transmissive spatial object display with a spatial object optical path with a black mirror where the path passes through the same Fresnel lens twice;

FIG. 23 illustrates a reflection reduction layer positioned between the observer and the first lens of a transmissive spatial object display to reduce effects of ambient room light;

FIG. 24 illustrates masking to reduce luminous aberrations in a Fresnel lens;

FIG. 28 illustrates an eye contact parabolic spatial image configuration;

FIG. 29 illustrates an eye contact fresnel spatial image configuration with an exposed beamsplitter;

FIG. 30 illustrates an eye contact fresnel spatial image configuration;

FIG. 31 illustrates an eye contact fresnel spatial image configuration with a rear projection eye contact screen;

FIG. 43 illustrates a sharp edge intersecting beamsplitter;

FIG. 44 illustrates a rounded edge intersecting beamsplitter;

FIG. 45 illustrates a tapered edge intersecting beamsplitter;

FIG. 46 illustrates an angled edge intersecting beamsplitter;

FIG. 47 illustrates a chemically hardened intersecting beamsplitter;

FIG. 48 illustrates light absorbing sections on a display to conceal the intersecting beamsplitter;

FIG. 49 illustrates an optical layer to conceal the intersecting beamsplitter;

FIG. 50 illustrates light absorbing sections on an optical layer;

FIG. 51 illustrates an intersecting beamsplitter with a curved section;

FIG. 52 illustrates a fold away intersecting beamsplitter with curved section;

DETAILED DESCRIPTION OF THE PREFERRED EMBODIMENTS

Figure 1:
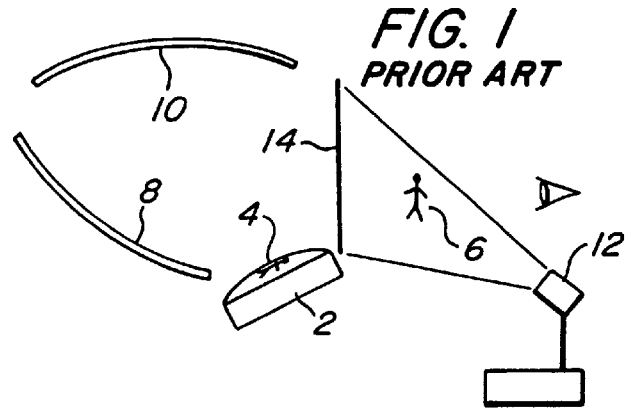
FIG. 1 illustrates a Prior Art reflective spatial object display with a background image formed by a scrim screen.
Figure 2:
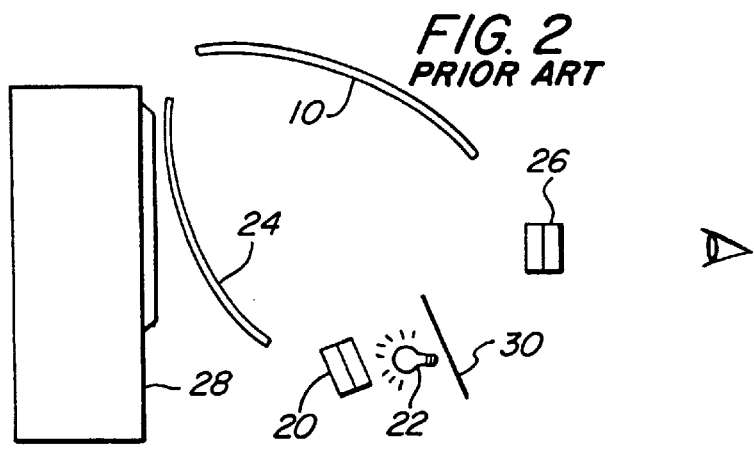
FIG. 2 illustrates a Prior Art reflective spatial object display with a background image behind a partially transparent concave mirror.
Figure 3:
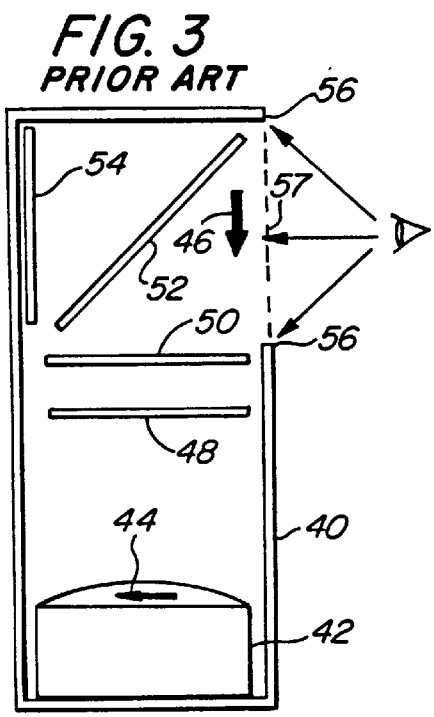
FIG. 3 illustrates a Prior Art transmissive spatial object display with a background image behind a partially transparent mirror.
Figure 4:
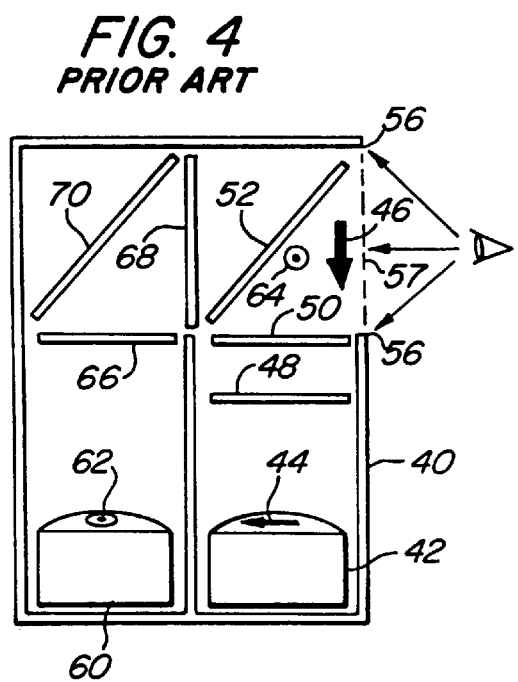
FIG. 4 illustrates a Prior Art transmissive spatial object display with two spatial objects.

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a spatial object display system wherein a front Fresnel lens projects a spatial object while imbuing a background image with enhanced three-dimensionality.

A spatial object imaging device 98 of FIG. 5 is an embodiment of the present invention that overcomes many of the drawbacks of the prior art. The device 98 produces two spatial objects that appear to float in space in front of the device a considerable distance beyond a housing 122. At the same time, a background image display 120 provides a backdrop image that appears to the observer to be three-dimensional and confined within the housing 122. A unique aspect of this invention is that the background image display 120 is viewed through a first Fresnel lens 108. Although the background image display 120 is a distance behind the first Fresnel lens 108 and also behind a first partially transparent mirror 106, the magnification of the background image display 120 by the first Fresnel lens 108 makes the background image appear only slightly behind the plane of the first Fresnel lens 108.

The partially transparent mirror 106 is not noticeable behind the first Fresnel lens 108, being essentially hidden by the optical characteristics of the first Fresnel lens 108. The magnification provided by the Fresnel lens 108 causes objects imaged on the background image display 120 to seemingly float just behind the Fresnel lens 108, especially if those objects are imaged on a black field. The magnification of the background image display 120 also imparts a pseudo 3-D depth to the two-dimensional image of the background image display 120. While the present inventors cannot completely explain this illusion, it is observable t hat the apparent depth is caused or enhanced by the curved distortion in the magnification of the first Fresnel lens 108. This magnification of the background image display 120 creates a dynamic movement when an observer shifts perspective, thereby further enhancing the 3-D appearance.

A first spatial object 110 is produced by an interaction of the first Fresnel lens 108 and a second Fresnel lens 104. The partially transparent mirror 106 folds the optical path at 45 degrees, allowing the background image display 120 to be positioned directly behind the first Fresnel lens 108. The first spatial object 110 originates from a first spatial object display 100 (i.e., a CRT or other image source). Between the second Fresnel lens 104 and the first spatial object display 100 light is folded by a first surface mirror 102. Between the second Fresnel lens and the first surface mirror 102 resides a second partially transparent mirror 114 angled at 45 degrees from a second spatial object display 112, which allows a second spatial object display 112 to join the optical path of the first spatial object 110. The second partially transparent mirror 114 permits imagery from the first spatial object display 100 to pass through unaffected. The second spatial object 116 shares the first Fresnel lens 108 and second Fresnel lens 104, as well as the reflection of the first partially transparent mirror 106.

All of the object/image displays used in the present invention produce a luminous image on a screen such as a cathode ray tube (CRT). The brightness of the display enhances the visibility of the spatial objects and the background image. Projection displays can also be used so long as they provide sufficient screen brightness. For housing compactness flat panels are preferred such as plasma display panels or field emitter displays, to name only a few. Additional Fresnel lenses may be used to magnify any of the displays' images before entering the optical configurations of this invention. This is especially helpful to enlarge flat panel images which tend to be small (a significant cost saving over large flat panels) and to enlarge spatial objects when desired.

FIG. 6 illustrates the device 98 of FIG. 5 in housing 122. The background image display 120 is concealed behind the first Fresnel lens 108. However, a background object image 124 imaged by the background image display 120 is seen with a floating appearance and with depth enhanced by the magnification of the first Fresnel lens 108. Though the background object image 124 may not appear directly on the plane of the first Fresnel lens 108, it neither appears to be static nor does it appear to be distant, at the rear of the housing 122. The background object image 124, especially when comprising a background object against a black field, appears to float in its own region of space behind the Fresnel in a way similar to the floating area for the first and second spatial objects 110 and 116 which are located in front of the Fresnel lens 108. Hence, the background image complements the floating characteristic of the spatial objects and thereby allows more dramatic visual presentations with enhanced impact.

The first Fresnel lens 108 also serves as a front screen such as the screen of a television or computer monitor, adding familiarity of its appearance as being a futuristic type of television or computer monitor. A speaker grill 126 conceals a speaker (not shown) and an air exhaust 128 conceals a cooling fan (not shown). An access door 131 with handle 132 is mounted to the housing 122 by hinges 130. The housing 122 can be used with all embodiments of this invention and preferably has light absorbing interior surfaces and has no openings, except for the opening for the first Fresnel lens 108, so that any unwanted ambient light cannot not enter the interior.

The construction of the device 98 is reproducible by any person skilled in the art by following these directions. A 27-inch television is used to provide the spatial object 110 and is positioned in a housing so that the bottom of its screen is 4 to 6 inches from the floor. A 20-inch television is used to produce the spatial object 116 and is rested in the housing so that the bottom of its screen is 27 to 29 inches from the floor. Another 20-inch television used for the background image display 120 is positioned in the housing so that the bottom of its screen is 54 to 56 inches from the floor. A front surface mirror is positioned in the housing at a 45-degree angle in front of the lowest display so that its reflection is aimed upwards. A 40% reflective/60% transmissive beamsplitter with an antireflection coating serves well for this invention, but also 30%R/70%T and 50%R/50%T beamsplitters and simple one-way mirrors and flexible mylar will also work. The beamsplitter is mounted in the housing at a 45-degree angle to the middle television so that its reflection is aimed upward. The reflective side of the beamsplitter is on the upward side. Another beamsplitter of the similar characteristic is mounted in the housing at 45 degrees in front of the top television, except this beamsplitter has its reflective side facing downward. Two full aperture Fresnel lenses 19⅝ inches by 24¹³⁄₁₆ inches were purchased from Edmund Scientific Part No. 43918. The first Fresnel lens 108 was mounted vertically in an opening directly in front of the top television. Grooves of the Fresnel lens 108 face inward toward the display. The second Fresnel lens 104 was mounted in the housing horizontally just below the bottom of the top television screen. Grooves of this Fresnel lens 104 face upward; however, the grooves face may generally face either way for this or the other Fresnel lens. The housing was constricted to prevent stray light from entering the interior except through the vertical mounted first Fresnel lens 108. The housing interior directly behind the Fresnel lens 108 was painted black, as was the rest of the interior, to control any stray light. The first spatial object 110 will appear with this construction to be about 23 inches from the surface of the first Fresnel lens 108 outside of the housing. The maximum first spatial object 110 size is about 7 inches high by 8 inches wide. The second spatial object 116 with this construction will appear 34 inches from the surface of the first Fresnel lens 108 outside of the housing. The second spatial object 116 maximum size is about 12 inches high by 14 inches wide. The background image display 120, when magnified by the first Fresnel lens 108, appears somewhat larger than the first Fresnel lens 108.

FIG. 7 illustrates the first spatial object display 100 seen with its luminescent screen 136. It is a central aspect of this invention that all spatial objects are set against a black (i.e., darkened) background. An imaged spatial object 138 is the image source for the first spatial object 110 and is shown positioned against a black background 142. This black background assures that the rectangular shape of luminescent screen 136 will not be seen floating together with the first spatial object 110. Only the first spatial object 110 is seen by the observer so that the appearance that the object 110 is floating is greatly enhanced. Were the rectangular shape of the luminescent screen 136 visible, it would cue the observer that the object's source is a display such as television, thereby destroying the illusion of a floating object. Also, when the rectangular shape of the screen is visible, the perception of the floating depth is more difficult to achieve. Therefore, even the perimeter 134 of the first spatial object display 100 is preferably dark as well to assure that its rectangular shape is not readily visible.

Not only is the black background 142 essential for this illusion, but the object itself should have a movement also, such as spinning on its axis, that permits shadings 140 and reflections (not shown) on the first imaged spatial object 138 to emphasize the object's dimensionality. This enhanced dimensionality of the imaged spatial object 138 not only assists in adding dimensionality to the first spatial object 110, thereby adding realism, but also assists the observer in ascertaining the spatial area where the first spatial object 110 resides. Computer rendering with 2-D and 3-D modeling allows an infinite variation of these visual requirements.

Similar quality effects can be produced by video taping or filming real objects. The luminescent screen 136 can image several objects simultaneously and can display nondimensional imagery such as a star field. Those in the production arts will appreciate the creative visual experiences made possible by this invention. Attention during productions should be given to correction of common image reversals and upside down images caused by being reflected and passing through the transmissive optics. Corrective procedures will be apparent to those skilled in the art using post production techniques and real time image manipulation electronics.

Although the black background 142 and dimensional image enhancements mentioned above are referenced for the spatial object 110, they also apply to the second spatial object 116 and any additional spatial objects. It is also a most important aspect of the present invention that the same also apply to the background image display 120 imaging floating objects. However, the background image display 120 may also be used to show more traditional images that reveal the rectangular shape of its screen. Productions for the background image display 120 and the spatial objects may be carried out independent of one another, but it is preferable that all images be synchronized to create specific visual effects that are repeatable.

With synchronization (see FIG. 16) it is possible to have, for example, the same spatial object travel from the background image display 120 to the first spatial object display 100 to the second spatial object display 112 with a consistency of motion and scale. It is also a practical application that, for example, the background image display 120 is independent, but the first spatial object display 110 and the second spatial object display 112 are synchronized. Other variations of synchronization will be apparent. Synchronization is also desirable so that images do not compete with one another. For example, if the second spatial object 116 is large and very bright, the background image object 124 or the first spatial object 110 may become unviewable because their light is unable to compete with the intensity of the light of the second spatial object 116. Creativity and knowledge-ability of the producer and special effects technicians are required to overcome these and related problems.

Variations of the scale and apparent floating distances (from the front of the unit) of any of the spatial objects of this invention are adjustable for a host of different products. Adjustments in scale and floating distance is achieved optically by adjusting one or all of the following: (1) increasing or decreasing the power of the first Fresnel lens 108 and/or the second Fresnel lens 104, (2) increasing or decreasing the size of the first Fresnel lens 108 and/or the second Fresnel lens 104, (3) adjusting the distance between the second Fresnel lens 104 and one of its corresponding spatial objects displays, and (4) adjusting the distance between the first Fresnel lens 108 and the second Fresnel lens. Also, direction of the spatial object 110 can be altered by tilting or turning either one of or both the first Fresnel lens 108 and the second Fresnel lens 104 relative to the corresponding spatial image display. It is important to note that the present invention is not limited to transmissive spatial optic systems that require two lenses. The first Fresnel lens 108 alone is sufficient to create a spatial floating object.

Different embodiments of the present invention include FIGS. 8, 9, and 10 which are configurations with component reductions compared to the embodiment 98. FIGS. 8, 9, 10, and 11 each have the essential element of this invention: the background image display 120 is magnified by the first Fresnel lens 108, while the first Fresnel lens is simultaneously utilized to create spatial objects such as the first spatial object 110. FIG. 8 illustrates the first Fresnel lens 108 creating both the spatial first object 110 and the spatial object 116. FIG. 9 illustrates an embodiment that produces only the first spatial object 110 by using the second Fresnel lens 104 as well as the first Fresnel lens 108. FIG. 9 also includes an additional third Fresnel lens 105 used to increase the size of the first spatial object 110 and reduce its distance from the first Fresnel lens 108. FIG. 10 illustrates the first spatial object 110 created by only the first Fresnel lens 108. FIG. 11 illustrates the same configuration as FIG. 10, except that the front surface mirror 102 has been removed. It will be apparent to those skilled in the art to configure all the embodiments of this invention with out the front surface mirror 102 or with additional mirrors (not shown) to fold light path as a particular application may require.

FIG. 12 offers a configuration of the present invention of in which an opposed spatial object display 150 directs it's light through the first partially transparent mirror 106 and the second Fresnel lens 104 to reflect back from a first surface mirror 154. After reflecting from the first partially transparent mirror 106, a spatial object 156 is produced by the second Fresnel lens 104 together with the first Fresnel lens 108. This configuration offers a more compact housing design and can be integrated with the addition of the first spatial object display 100 by replacing the first surface mirror 154 with a horizontal partially transparent mirror 158 as seen in FIG. 13. In addition, the second spatial object display 112 can be included as seen in FIG. 14, creating a total of three spatial objects. The background image display 120 in FIGS. 12–14 operated as described in the embodiment 98 of FIG. 5.

The basic optical functioning of the first Fresnel lens 108 in all the embodiments of the present invention is as follows. The first spatial object 110 is produced by placing the first spatial object display 100 a sufficient distance behind the first Fresnel lens 108 so that the imaged spatial object 138 on the luminescent display screen 136 (FIG. 7) has a point of convergence on the observing side of the first Fresnel lens 108 and thereby produces the first spatial object 110. The first spatial object 110 appears to float between the observer and the first Fresnel lens 108. The first spatial object display 100 can be moved closer to or further away from the first Fresnel lens 108 to adjust the size and position of the first spatial object 110 floating between the first Fresnel lens 108 and the observer. Generally, moving the first spatial object display 100 closer to the first Fresnel lens 108 will cause the first spatial object 110 to move closer to the first Fresnel lens 108. However, if the first spatial object display 100 is brought too close to the first Fresnel lens 108, the spatial image will 110 will no longer exist as a floating object. If the background image display 120 is placed at this distance (or closer) to the first Fresnel lens 108, a magnified view of the background image 124 (FIG. 6) will appear behind the first Fresnel lens 108 from the observer's point of view.

When used in this manner, the first Fresnel lens 108 is serving to create a magnified view of the background image display 120. If the background image display 120 is brought still closer to the first Fresnel lens 108, further magnification of the background image display 120 occurs although the background image object 124 continues to appear behind the first Fresnel 108. These general types of adjustment apply to all embodiments of the present invention and for a wide variety of focal lengths (lens powers) of the first Fresnel lens 108. Different lens powers alter the size and position of the spatial objects as well as the degree of magnification of the background.

Additional lenses, such as the second and third Fresnel lenses, are used in the production of the spatial objects for the following purposes: (1) to reduce the distance between the first Fresnel lens 108 and the spatial object; (2) to increase the viewing radius of the spatial object; and (3) to enhance the sharpness of the spatial object. The third Fresnel lens 105 functions similarly to the second Fresnel lens but causes an even greater reduction of distance from the first Fresnel lens 108 to the spatial object, causes a further expansion of the viewing radius, and further increases the object sharpness. It will be apparent to one of ordinary skill in the art that the three Fresnel configuration is ideal for interactive applications where the spatial objects need to be quite close to the first Fresnel lens 108.

In many housings used for video games and slot machines, for example, there may not be sufficient space to practically position the background image display 120 behind the first partially transparent mirror 106 and the first Fresnel lens 108. A unique embodiment of the present invention, see FIG. 15, uses the configuration of FIG. 13, except that the first spatial object display 100, which is normally positioned at a sufficient distance from the second Fresnel lens 104 so as to create the first spatial object 110, is replaced with the background image display 120. The background image display 120 is positioned close enough to the second Fresnel lens so that a spatial object is not created. As a result, the background image display 120 will appear at the background image position 159 when reflected by the first partially transparent mirror 106 and provide the intended pseudo 3-D depth when viewed through the first Fresnel lens 108.

For FIGS. 13–15, light from the displays facing each other may tend to wash out each other's images. The first partially transparent mirror 106 is most reflective when the back side of the first partially transparent mirror 106 (away from a display) is dark. When luminous displays are located on both sides of the first partially transparent mirror 106, reflectivity may suffer. This problem can be remedied by introducing sheets of polarizing material (not shown) on or near each display. By cross-aligning the sheets of polarizing material, this washout problem will be eliminated by providing a dark back side of the partially transparent mirror 106 for each display.

FIG. 16 illustrates a synchronization block diagram so that image output signals can be effectively synchronized for repeatable visual effects. All or any combination of display sources of this invention for spatial objects and the background image display 120 are preferably synchronized. A first laser disc player 160, a second laser disc player 162, and a third laser disc player 164 receive an operating signal from a show controller 166. A control interface 166 allows a programmer or an interactive observer to initiate and terminate various programmed synchronized arrangements. The first video out 170, the second video 172, and the third video out 174 connect to the displays (not shown). Audio as well can be synchronized with this device.

One of many possible effects made possible by synchronization is the illusion that a spatial object detaches from the background image and zooms up to float in a first position beyond the first Fresnel lens 108 and continues to move to occupy a second position farther from the first Fresnel lens 108. To achieve this effect the background image display 120 (see FIG. 5) first shows the object as part of the background. Then the object becomes larger and then appears on the first spatial image display 100 to appear as the first spatial object 110 near the first Fresnel 108. It is likely that the synchronization system will permit a momentary presence of the object on both displays, perhaps combined with a brief blurring to enhance the illusion of movement. Then the object on the first spatial object display 100 continues to enlarge in size and transfers to the second spatial object display 112 to appear as the second spatial object 116 even farther from the Fresnel lens 108 and closer to the observer. Proper synchronization, combined with a smooth change in the object's size, will result in a very effective illusion of motion towards the observer.

The control interface 168 may be any type of input means such as voice recognition, and also technologies such as microwave and infrared will enable the observer to reach out to one of the spatial objects and, in free space, trigger an invisible grid detector with interactive functions. Synchronization can also originate from one or several computers with supportive software and hardware and would operate with the same functional outcome. Any of the components can be connected by wireless transmission technologies. Lastly, on-line access connection 176 connects one or all of the displays of this invention and may as well connect the show controller 166. Data of any form can be received from a distant source and data can also be retrieved. Hence, it is to be expressly understood that present invention in its most elaborate configuration is connected to a network which allows specific programs for gambling devices, retail kiosks and so forth to be custom designed for interactive and remote access to a variety of desired functions.

The present invention is ideally suited to integrate robotic movement to its displays, mirrors, partially transparent mirrors and, in particular, the second Fresnel lens 104 and the first Fresnel lens 108. FIG. 17 illustrates the robotic movement of the first Fresnel lens 108 by the actuators 182 attached to the first Fresnel lens 108 by ball pivots 180. Connecting conduit 184 which originates from a movement controller (not shown) initiates movement in each actuator 182. The first Fresnel lens 108 has a full range of motion from left to right, back and forward, and up and down. The first spatial object 110 accordingly responds with movement in the same direction the first Fresnel lens 108 is directed. FIG. 18 illustrates robotic movement of the first spatial object display 100. As the first spatial object display 100 moves up and down the first spatial object 110 moves back and forth in front of the first Fresnel lens 108. Movement can be controlled live or preprogrammed and can be integrated as a part of the show controller 166 of FIG. 16. The actuators 182 are bolted through bolt holes 186 to a rigid structure (not shown). In a similar fashion, the first spatial object display 100 can be mounted to the actuators 182, which permits the first spatial object 110 to move towards and away from the first Fresnel lens 108.

FIG. 19 illustrates a stair step screen 192 that permits variable spatial object depth positions 196, 198, and 200. The screen disperses the focused light of a projector 190. A flat screen 194 (dotted line) can also be utilized to create variable depth and size positions. Any transmissive spatial object embodiments of this invention can be integrated this screen. FIG. 20 illustrates the use of a dimensional screen 202 for use with any of the embodiments of this invention. The three-dimensional shape of the dimensional screen 202 permits spatial objects to move with a variety of depth positions and sizing depending upon the shape of the screen and their position on the screen.

When it is desirable for certain various housing designs, a mirror (not shown) may be used to reflect the first Fresnel lens 108 so that it is actually the mirror that the observer views. With this in mind, the present inventors have designed a transmissive spatial object display that incorporates a flat black mirror (i.e., reflection from a pane of black glass or plastic) that serves as the viewing surface. A black mirror 208 of FIG. 21 eliminates the appearance of looking into a lens by reflecting only the light of the reflective spatial object 208 and not the "signature" of the Fresnel lens 206. FIG. 21 is configured with a first Fresnel lens 108 and a second Fresnel 104 and a reflected spatial object display 210. Additional spatial objects may be added, as taught in the other embodiments of the present invention. Although a two-transmissive lens spatial object display is disclosed in FIG. 21, any transmissive spatial object display can benefit from use of the black mirror 208. The same is true for the embodiment of FIG. 22, that shows the first Fresnel 108 allowing an image to pass through before being reflected back through the first Fresnel lens 108 by the second front surface mirror 154. Image blocking film 206 is added to block light emitted by the reflected spatial object display 210 so that it is "hidden" from the observer, yet still transmits toward the black mirror 208 (see also FIG. 21) and toward the first Fresnel lens 108 (FIG. 22). The image blocking film has the unique property of transmitting light that is normal to the film while blocking light that strikes the film at an angle. Although optional with the use of the black mirror 208, the image blocking film substantially improves upon common transmissive spatial object displays. "Light control film" from 3M Inc. is preferred, but this is not the only source for image blocking film 206. Other film may only diffuse the side image, but are still considered an image blocking film 208 in respect to the application of this invention.

When the observer gazes at the first Fresnel lens 108, excessive reflections of ambient light and glare can distract from or destroy the clarity of the first spatial object 110, the second spatial object 116, and the background image display 120. The prior art solves this serious problem by placing viewing optics deep within a housing. The present invention deals with ambient light by using a neutral density filter 107 layered between the observer and the first Fresnel lens 108. The neutral density filter 107 serves to reduce the intensity of reflected light, reduces the visibility of the first Fresnel lens 108 as a lens, substantially reduces the glare off the first Fresnel lens 108, and gives a uniform front screen appearance to the first Fresnel lens 108 similar to that of a television screen or a computer monitor screen. A wide range of different types of neutral density filters have been successfully employed for neutral density filter 107, ranging from interference filters, exotic antireflective and antiglare coatings to off-the-shelf smoked gray acrylic plastic. Also, image blocking film from 3M Inc. has been successfully used to block a significant part of the interfering reflected light. The neutral density filter 107 can either be coated directly onto the first Fresnel lens 108 or can be a separate glass, plastic or film substrate.

While the use of the neutral density filter 107 is illustrated in many embodiments of this invention and causes a significant improvement to the resulting images, it need not be applied in environments where ambient light is minimal or controlled. FIG. 23 illustrates the above-described neutral density filter 107 generically applied to any type of transmissive spatial object display that utilizes at least one Fresnel lens with or without a background image.

In many configurations of the present invention a circular luminous aberration 213 may be visible as a "halo" in the first Fresnel lens 108 (see FIG. 24). This is especially prominent when the first spatial object 110 is configured to float close to the first Fresnel lens 108 as in FIG. 9. This circular luminous aberration appears near the outer perimeter of the first Fresnel lens 108 and can be particularly annoying to the observer who is position directly in front of the first Fresnel lens 108. A simple yet effective means of eliminating this aberration 213 is to mask the second Fresnel lens 104. An outer perimeter mask 211 blocks this distortion so that it does not reach the first Fresnel lens 108. The outer perimeter mask 211, however, does not cover the anything except the edges of the second Fresnel lens 104 so that production of a spatial object is not interfered with at all. The outer perimeter mask 211 may be an opaque (preferably black) material but may also be a neutral density filter or other similar light absorbing substrate. The outer perimeter mask 211 may also advantageously be applied to other Fresnel lens employed in this invention for reduction of flare and other peripheral aberrations.

The present inventors have invented a novel approach to integrating a background image with an accessible screen to both reflective and transmissive spatial object displays. A considerable body of research in the teleconferencing eye-contact field has contributed to unique rear projection screens that have two optical modes: The first mode is a diffused one that disperses a projection beam to create a visible image as in an ordinary rear projection screen. The second is a transparent mode which allows impinging light to pass freely through the screen. These diffused/transparent screens are ideal for creating a background image on the rear projection screen and also to allow light beams for producing one or more spatial objects to pass through the same screen. The two optical modes may be temporally separated or may be spatially separated through the use of polarized light.

Figure 25:
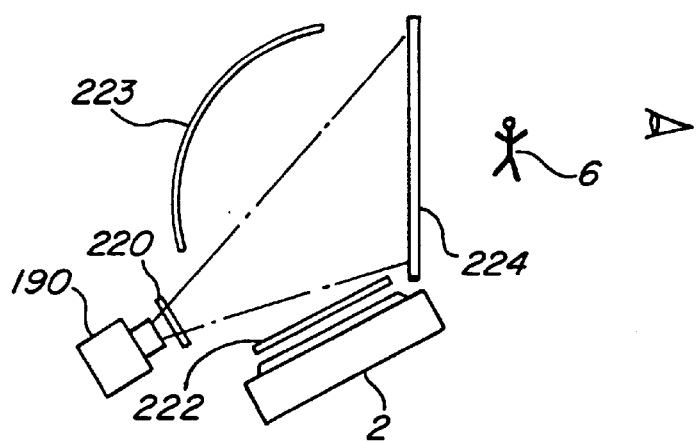
FIG. 25 illustrates a reflective spatial object display with a polarized background projection screen system.

FIG. 25 illustrates a reflective spatial object optical arrangement comprising a concave mirror 223 (dual concave mirror s, although not shown, may also be employed) which may be of any color. The present inventors have added a special diffused/transparent screen 224 that is responsive to polarized light. The structure of the polarized diffused/transparent screen 224 permits two operational modes by a patterned polarizer or polarized lenticulations. A properly aligned polarized beam will diffuse upon striking the screen 224, while a beam of opposite polarization will pass through the screen 224.

Figure 26:
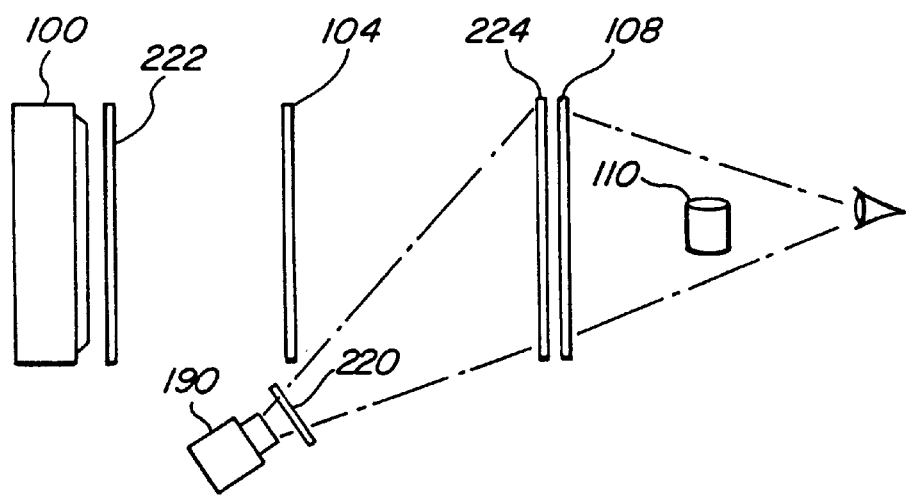
FIG. 26 illustrates a transmissive spatial object display including a polarized background projection screen system.

A projector 190 for producing a background image is focused upon this polarized diffused/transparent screen 224. The first spatial object 110 originates from the first spatial object display 100 and is projected through the polarized diffused/transparent screen 224. Positioned in the beam of the projector 190 is a first polarizer 220, and positioned in front of the first spatial object display 100 is a second polarizer 222. The first polarizer 220 is cross-polarized in reference to the second polarizer and aligned in relation to the polarized diffused/transparent screen 224. When aligned, the projector 190 disperses an image upon the polarized diffused/transparent screen 224. Simultaneously, the light beam forming the first spatial object 110 passes through the polarized diffused/transparent screen 224. FIG. 26 illustrates similarly the same polarized diffused/transparent screen 224 integrated with a transmissive spatial object display. Though shown in FIG. 26 with two Fresnel lenses, a single lens display may also be adapted to this technology.

Figure 27:
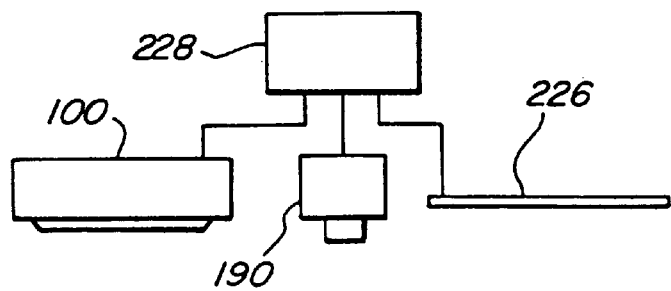
FIG. 27 illustrates on/off synchronization of a projector and a display for generating spatial objects images by using an alternating diffused/transparent screen.

Liquid Crystal Display (LCD) polymer film is in common use for adjustable architectural windows. When the LCD film receives an electrical current, the liquid crystals rearrange their orientation from a diff-used mode to a transparent mode. FIG. 27 diagrammatically illustrates the use of a synchronization electronics 228 that pulses the LCD diffused/transparent screen 226 in an on/off sequence allowing the projector 190 to disperse an image in the diffused mode and permits the first spatial object display 100 to be seen in the transparent mode. In actual use the configuration of the projector 190 and the display 100 would be arranged as in FIGS. 25 and 26. Of course, the polarizers 222 and 220 would not be needed when using the LCD diffused/transparent screen 226. The projector 190 and the first spatial object display 100 are both shown connected to the synchronization electronics 228 so that the projector is "on" during the diffused mode and "off" during the transparent mode. Likewise, the first spatial object display is synchronized so that it is "on" during the transparent mode and "off" during the diffused mode. Although the projector 190 and the first spatial object display 100 are shown connected to the synchronization electronics 228, one or both need not be. In the case both are not connected, the synchronization electronics 228 serves only to pulse the LCD diffused/transparent screen 226 rapidly "on" and "off."

An important advancement in the field of teleconferencing is to create the natural three dimensional appearance of a conferee and the appearance that a conferee is not confined to a screen. By doing so, teleconferencing can be greatly improved with the imaged conferee appearing to actually be present during the conference in the same room, even though the conferee may be thousands of miles away. Spatial imaging devices can certainly create a floating and, to a certain degree, a three dimensionally enhanced appearance of a conferee. These devices are not configured, however, with the most important aspect of all high quality economically designed videoconferencing systems the ability to provide eye contact. When a camera is mounted away from the eyes of the spatially imaged conferee, the conferee observing the spatially imaged conferee fails to look into the camera. The result, if both conferees have such a system, is that they appear to be looking away rather than toward one another with natural eye contact. Eye contact is fundamental to natural conversation. When a person looks away they may appear to be shifty, tired or bored with the conversation. Hence, to prevent the transmission of misleading images, the camera requires to be on an optical axis with the actual spatially imaged conferee to create natural eye contact.

FIG. 28 illustrates the concave mirror 223 spatially imaging a spatial imaged second conferee 240 whose image is being produced by second conferee display 246. The spatial imaged second conferee 240 is located at a remote teleconferencing terminal whose image is being transmitted to the spatial imaging teleconferencing terminal comprised within a teleconferencing housing 248. A video camera 250 utilizes the reflection of the first partially transparent mirror 106 to capture an image of a first conferee 242 for transmission to the spatially imaged second conferee. The video camera 250 captures an image of the first conferee through the spatially imaged second conferee 240 along an optical axis 238 to permit an eye contact image of the first conferee 242 to be captured by the video camera 250. Hence, the first partially transparent mirror 106 is transparent, allowing the spatial imaged second conferee 240, produced by the concave mirror 223, to be seen and, also, reflects the image of the first conferee 242 for image capturing by the video camera 250. A black shield 244 is utilized to enhance the reflective properties of the first partially transparent mirror 106. The concave mirror 223 is a typical parabolic mirror used for spatial imaging and additional concave mirrors can be used as desired. The common drawbacks to these devices are discussed earlier in this specification.

FIG. 29 illustrates an eye contact teleconferencing terminal utilizing a specific fresnel spatial imaging arrangement. The deployment of the video camera 250 behind the spatial imaged second conferee 240 on the optical axis 238 permits the capturing of an eye contact image of the first conferee 242. The spatial imaged second conferee 240 is produced by a first spatial imaging fresnel 256 and a second spatial imaging fresnel 258. Though shown with two fresnel lenses, one lens or three lenses can be applied to this configuration. With the added eye contact capability this optical arrangement is greatly improved for many practical teleconferencing applications.

FIG. 30 illustrates the preferred configuration utilizing the optical arrangement as described for FIG. 9. In this arrangement the video camera 250 is aimed through the first fresnel lens 108. The result is the magnification of the first conferee 242 which adds a dynamic dimensionality to image captured by the video camera 250 of the first conferee's 242 image. Any unwanted distortions caused by magnification is successfully corrected electronically by a variety of image manipulations techniques and procedures such as computer aided image manipulation.

FIG. 31 illustrates a single fresnel 260 spatial imaging device (additional fresnel lenses can be utilized) combined with a dual mode rear projection screen 262 which is either the polarized diffused/transparent screen 224 or the LCD diffused/transparent screen 226. Not only does the spatial imaged second conferee 242 utilize a transparent mode of the dual mode rear projection screen 262, but also the video camera 250 for capturing an image of the first conferee.

Figure 32:
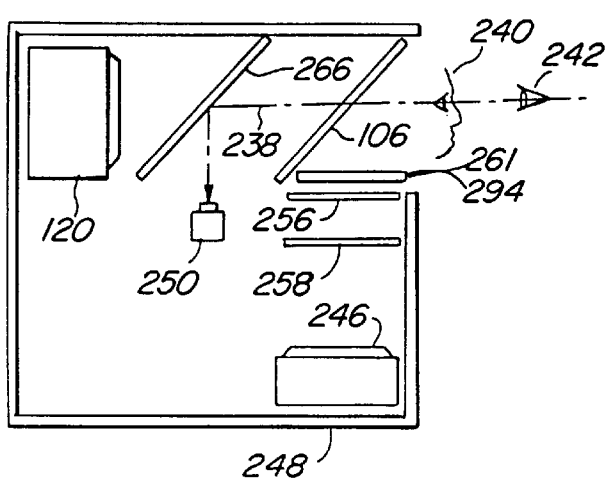
FIG. 32 illustrates an eye contact fresnel spatial image configuration with an exposed beamsplitter and background image.
Figure 33:
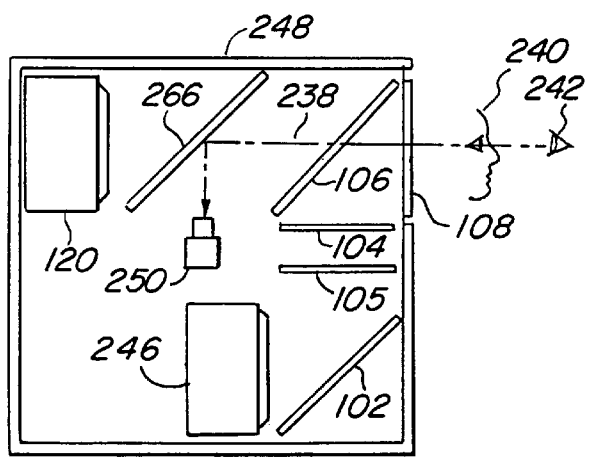
FIG. 33 illustrates an eye contact fresnel spatial image configuration with a magnified background image.

An important aspect of the present invention is to provide a background image that appears behind the spatial imaged second conferee 240. FIG. 32 illustrates the background image display 120 configured into the embodiment of FIG. 29. Since the background image display 120 is seen behind the spatial imaged second conferee 240, the video camera 250 is added into the optical axis 238 by the addition of an eye contact beamsplitter 266. Likewise, FIG. 33 illustrates the background image display 120 added to the embodiment of FIG. 30. An image blocking film 261 is applied to the first spatial imaging fresnel 256. The image blocking film 261 substantially improves this specific fresnel arrangement by hiding the fresnel from the first conferee's 242 view. Typically image blocking film comprises tiny microlouvers which, in this case, are oriented to expose the first spatial imaging fresnel 256 to the partially transparent mirror 106 allowing an image to pass through and, simultaneously blocking the first spatial imaging fresnel 256 from the first conferee's view. The image blocking film greatly reduces the distraction of seeing the fresnel lens, improves image contrast, and reduces the circular luminous aberration 213 as described in FIG. 24. The image blocking film 261 may be applied to specific arrangements of FIGS. 29 and 34. Also image blocking film 261 can be applied to the top of the second fresnel lens 104 (see FIG. 30 and all figures with the second fresnel lens 104) to reduce the circular luminous aberration 213 and improve image contrast.

Both FIGS. 32 and 33 serve well for many eye contact applications of the present invention. However, the depth of the teleconferencing housing 248 in these figures offers a restriction for many uses where space is limited. Many teleconferencing terminals used in public areas and in offices must be as thin in profile as possible. Otherwise the limitation of available space may prevent the use of this present invention. The overall depth of the housing 248 of FIGS. 32 and 33 is significantly increased by the introduction of the eye contact beamsplitter 266. Another drawback of introducing the eye contact beamsplitter 266 is that the background image display 120 appears far recessed into the teleconferencing housing 248. This far recessed background image makes viewing some graphics and especially text difficult to read.

Figure 34:
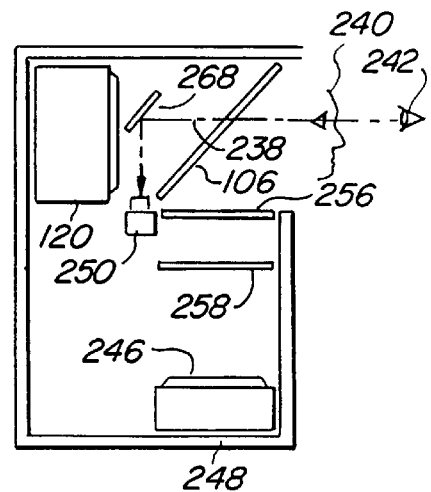
FIG. 34 illustrates an eye contact fresnel spatial image configuration with an exposed beamsplitter and an intersecting beamsplitter.
Figure 35:
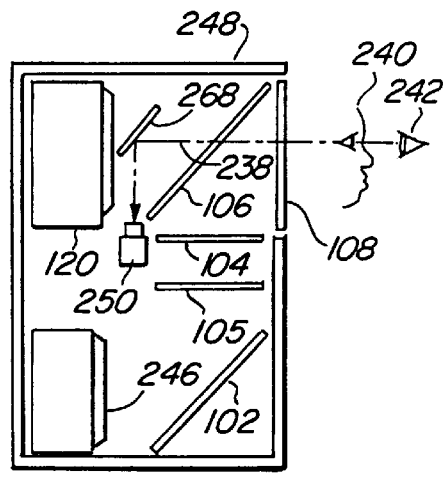
FIG. 35 illustrates an eye contact fresnel spatial image configuration with a magnified background image and an intersecting beamsplitter.

FIG. 34 illustrates the embodiment of FIG. 32 and FIG. 35 illustrates the embodiment of FIG. 33 except that the eye contact beamsplitter has been replaced by an intersecting beamsplitter 268. A unique embodiment of the present invention with broad applications is the use of a partially transparent mirror that does not cover the entire display surface. By doing so, the protrusion of the eye contact beamsplitter 266 can be dramatically reduced and thereby reduce the depth of the teleconferencing housing 248 and enable positioning the background image display 120 closer to the first conferee 242. Detailed aspects of the deployed use of the intersecting beamsplitter 268 is explained in the specification for the following figures and adaptable into the teleconferencing housing 248. The intersecting beamsplitter 268 is ideally used for spatial imaging displays with eye contact, but also substantially improves the reduction of the terminal depth of eye contact systems for desktop videoconferencing and group conferencing with displays that can be larger than 80 inches diagonal. Hence, the intersecting beamsplitter 268 is scaleable depending upon the teleconferencing application.

Figure 36:
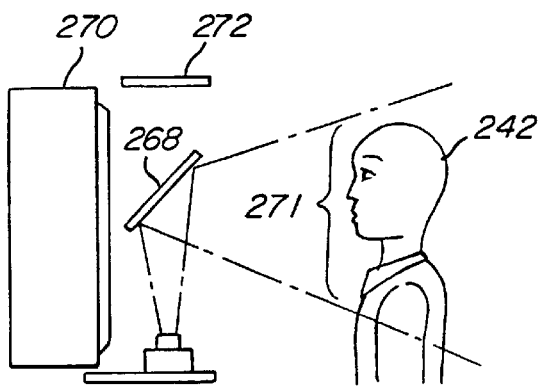
FIG. 36 illustrates an intersecting beamsplitter configuration with a camera aiming upward.
Figure 37:
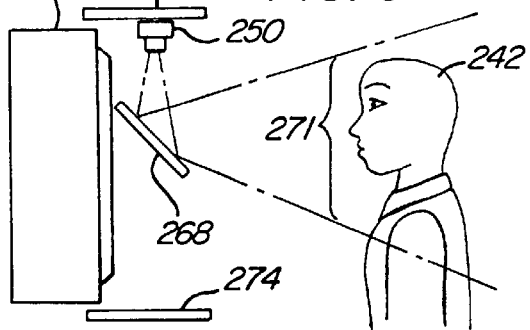
FIG. 37 illustrates an intersecting beamsplitter configuration with a camera aiming downward.

FIG. 36 illustrates the intersecting beamsplitter 268 positioned in front of the viewing surface of the a teleconferencing display 270. In this configuration, the video camera 250 is aimed upward capturing a bust shot 271 of the first conferee 242 viewing a non-spatial imaged second conferee on the teleconferencing display's 270 viewing surface (not shown). A bottom support wall 274 supports the video camera 250 and a top support wall 272 blocks out ambient light from diminishing the reflectivity of the intersecting beamsplitter 268. FIG. 37 illustrates the same embodiment of FIG. 36 except that the video camera 250 is aimed downward.

Figure 38:
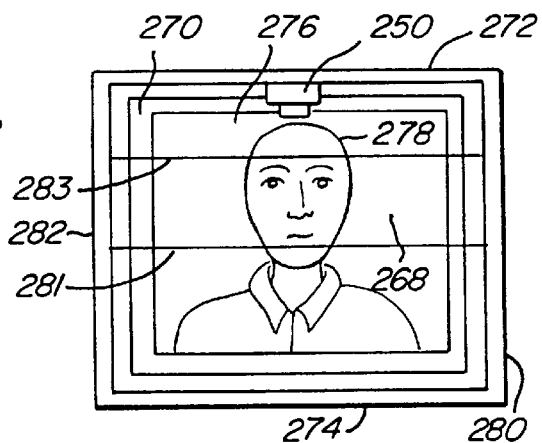
FIG. 38 illustrates a front view of the intersecting beamsplitter supported by a housing.

FIG. 38 illustrates a front view of FIG. 37. Clearly illustrated the intersecting beamsplitter 268 is shown intersecting a viewing surface 276 of the teleconferencing display 270. Both a top edge 283 and a bottom edge 281 of the intersecting beamsplitter are positioned over the viewing surface 276. The intersecting beamsplitter 268 is positioned over the eyes of an imaged second conferee 278 so that the video camera 250 can capture a reflection of the first conferee 242 (not shown) on the intersecting beamsplitter 268.

The intersecting beamsplitter 268 is suspended by being connected to a left support wall 282 and a right support wall 280. Other means of suspending the intersecting beamsplitter 268 can as well be deployed, such as hanging by wires or even glued directly to the viewing surface 276. The walls 272, 274, 280 and 282 form a housing which is positionable in front of the teleconferencing display 270.

Figure 39:
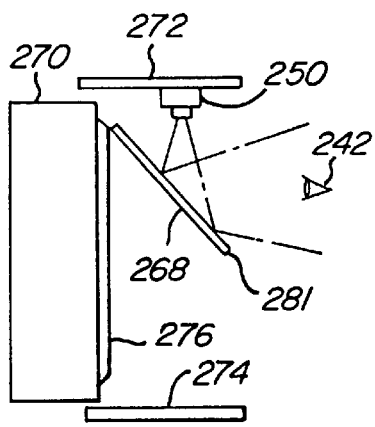
FIG. 39 illustrates a partial intersecting beamsplitter configuration with the camera aimed downward.
Figure 40:
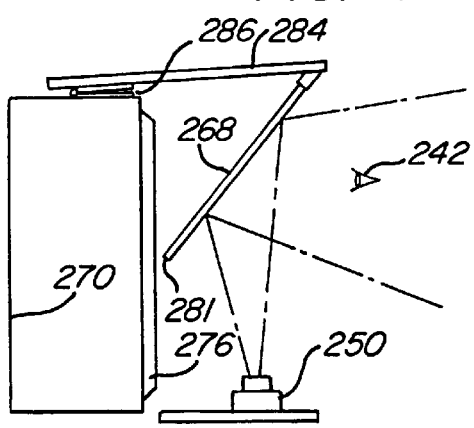
FIG. 40 illustrates a partial intersecting beamsplitter configuration with the camera aimed upwards.

FIG. 39 illustrates the intersecting beamsplitter 268 with only the bottom edge 281 exposed over the surface of the viewing surface 276. A single exposed bottom edge 281 will not permit as great of reduction in the protrusion of the intersecting beamsplitter 268 as having both the top edge 283 and the bottom edge 281 exposed over the viewing surface 276. However, a single exposed edge may serve adequately for many applications and permits a rather simple display mounting design as seen in FIG. 40. Here the intersecting beamsplitter 268 is suspended from the top by a roof 284 connected to the teleconferencing display 270 by a hook and loop fastener 286.

Image light emitted from the teleconferencing display 270 may affect the reflectivity of the intersecting beamsplitter 268. Certain optical elements can block image light from the perspective of the camera yet still allow that image to be viewable by the first conferee will serve to remedy this problem. These methods are not deployed to reduce the protrusion of the intersecting beamsplitter 268 by reducing its angle to the teleconferencing display 270, but rather permits the intersecting beamsplitter, even at a 45 degree angle from the teleconferencing display 270, to be positioned up against the viewing surface 276.

Figures 41, 42:
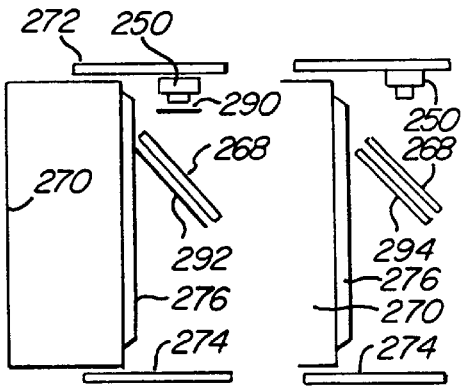
FIG. 41 illustrates polarizers used to block intruding display light into camera.
FIG. 42 illustrates image blocking film to block intruding display light into camera.

FIG. 41 illustrates the use of polarizers to create image blocking from the camera's 250 perspective. A camera polarizer 290 is cross polarized with a display polarizer 292. The first conferee can view the viewing surface 276 through the display polarizer 292 while the viewing surface 276 and its emitted light is blocked from the video camera 250 due to the camera polarizer 290. The display polarizer 292 is seen only behind the intersecting beamsplitter 268, but may be positioned parallel to the display over a portion of the viewing surface 276 or over the entire viewing surface 276. FIG. 42 illustrates the use of a microlouver image blocking material 294 which blocks light and the image from the viewing surface 276 from reaching the camera. The louvers are positioned to allow the first conferee to see through to the viewing surface 276. With adjustment to the direction of the microlouvers the microlouver image blocking material 294 can as well be positioned parallel to the viewing surface 276 over a portion or the entire viewing surface 276. Other optical materials and methods can be used to block the display light and image from the perspective of the video camera 250 to enhance the reflectivity of the intersecting beamsplitter 268.

FIG. 43 shows a sharp edge 296 of the intersecting beamsplitter 268. The sharp edge 296 will be very noticeable when positioned in front of the viewing surface 276. A principle embodiment of the present invention is to conceal the edges, as much as possible, so that they are not a distraction when the first conferee observes the viewing surface 276 of the teleconferencing display 270. The sharp edge 296 can be concealed from reflections by creating rounded edges 298 as seen in FIG. 44. A tapered edge 300 of FIG. 45 will aid even further in concealing the intersecting beamsplitter edges. Still further, FIG. 46 illustrates the addition of an angled edge 302 that is angled along the line of sight of the first conferee 242 to minimize the first conferee's view of the edges. Antireflective layers are also applied to the edges to reduce their visible appearance by minimizing reflections upon the edges (not shown). The thickness of the intersecting beamsplitter 268 can also be a distraction. By utilizing a chemically hardened glass substrate (FIG. 47), the thickness of the intersecting beamsplitter 268 can be reduced without sacrificing strength. For example, a ¼ inch thick piece of glass could be substituted with a 1/16 inch thick piece of glass. The previous edge treatments can be applied to the chemically strengthened piece of glass. Stretched film, such as mylar, can as well substantially reduce the edge thickness and thereby assist in edge concealment (not shown). Often beamsplitters are made with a glass substrate that has a colored edge such as green. By using an optically pure glass substrate (not shown), the edge can be more effectively concealed if it is clear so that it melds in with the viewing surface 276.

Beamsplitter coatings usually have some light absorbing quality, which, when positioned over a portion of the viewing surface 276, that portion may appear darker and of a different chromaticity than the uncovered portion. Hence, it is a primary embodiment of the present invention to conceal the entire intersecting beamsplitter 268. FIG. 48 illustrates the use of a sectional light absorbing layers 306 and 308 on the portions of the display not covered by the intersecting beamsplitter 268 to conceal the intersecting beamsplitter 268 from the perspective of the first conferee 242. FIG. 49 illustrates the use of a single light absorbing layer 310 over the entire viewing surface 276 positioned between the intersecting beamsplitter 268 and the first conferee 242 for concealing the intersecting beamsplitter 268. Also, the single light absorbing layer 310 serves effectively to conceal the edges of the intersecting beamsplitter 268. FIG. 50 illustrates concealment means by sectional light absorbing layer 313 that has little or no light absorbing quality over a section 314 and more light absorbing quality over a sections 312 and 316. Tapering techniques can be used so that each section gradually changes to a different light absorbing quality. All the light absorbing layers discussed for FIGS. 48, 49, and 50 can be a neutral density filter and all can be selected with the correct chromaticity value so that the entire viewing surface 276 appears to have the same chromaticity. Another effective method for concealing the intersecting beamsplitter 268 is to image manipulate in real-time the actual image displayed on the viewing surface 276 (not shown). Relevant portions of the image are selected to be brighter or darker than other portions and also have corrected chromaticity values.

FIG. 51 illustrates a method to suspend the intersecting beamsplitter 268 by molding into it a subtle curve 320 and extension portion 322. The fabrication of this custom beamsplitter requires attention to the optical coating process for optimum performance. Beamsplitter section 318 has a reflective coating which tapers off into subtle curve 320 and eliminated entirely in the extension portion 322. By eliminating the reflection coating, excessive glare will not result over the extension portion 322. A light absorbing layer may as well be used in the extension portion 322 and tapered into the subtle curve 320 to match the light absorption of the reflective coating on section 318.

FIG. 52 illustrates the intersecting beamsplitter configuration of FIG. 51. Attachment plate 324 connects the device to the teleconferencing display 270. A stiff hinge 326 permits the video camera 250 and its mounting plate 328 and the intersecting beamsplitter 268 to fold upward over and on top of the teleconferencing display 270. FIG. 52 serves as an illustrative possibility, but numerous positioning means to remove the intersecting beamsplitter 268 will be apparent to those skilled in the art. Such positioning systems may permit the video camera 250 to be aimed independently away from the intersecting beamsplitter 268 and can be detachable as well. Sliding tracks, hinges, folding mechanisms, detachable hook and loop connections, and so on, are all suitable for any configuration of the present invention.

Figures 53, 54, 55:
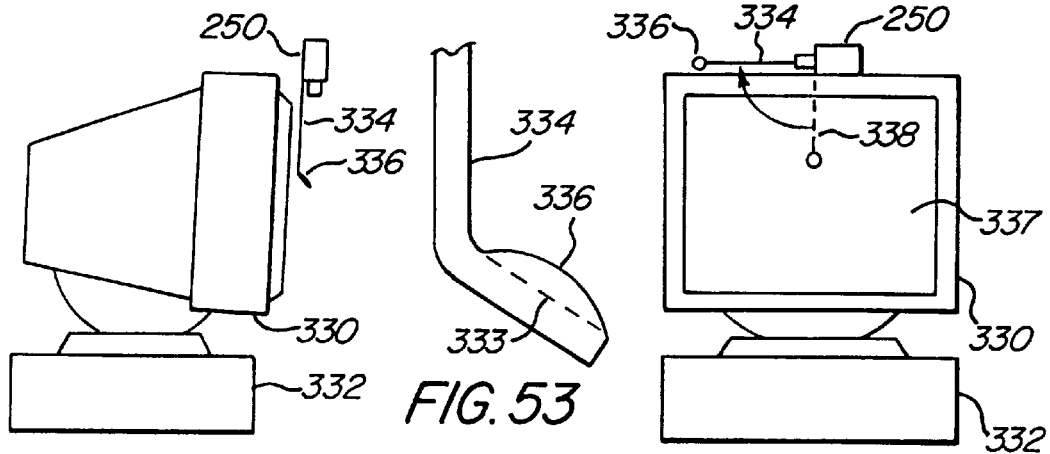
FIG. 53 illustrates a micro intersecting beamsplitter.
FIG. 54 illustrates a fold away micro intersecting beamsplitter.
FIG. 55 illustrates a side view of a micro intersecting beamsplitter.

Another important configuration of the present invention is a dimensional intersecting beamsplitter to expand the reflected image of the first conferee 242 to create the bust shot 271 as seen in FIGS. 36 and 37. FIG. 53 illustrates the use of a transparent suspension rod 334 with a reflective dimensional area 336. A straight line 333 is shown for reference to illustrate the dimensional area 336. The reflective dimensional area 336 is also partially transparent permitting the observing of a monitor viewing surface 337 as seen in FIG. 54. Although this configuration can be used with any teleconferencing display arrangement for illustrative purposes a computer monitor 330 on top of a computer 332 is shown. A position 338 is where the transparent suspension rod would be positioned while in use. As illustrated, it can be spun out of the way on top of the monitor 330. FIG. 55 presents a side view of the present configuration.

Figure 56:
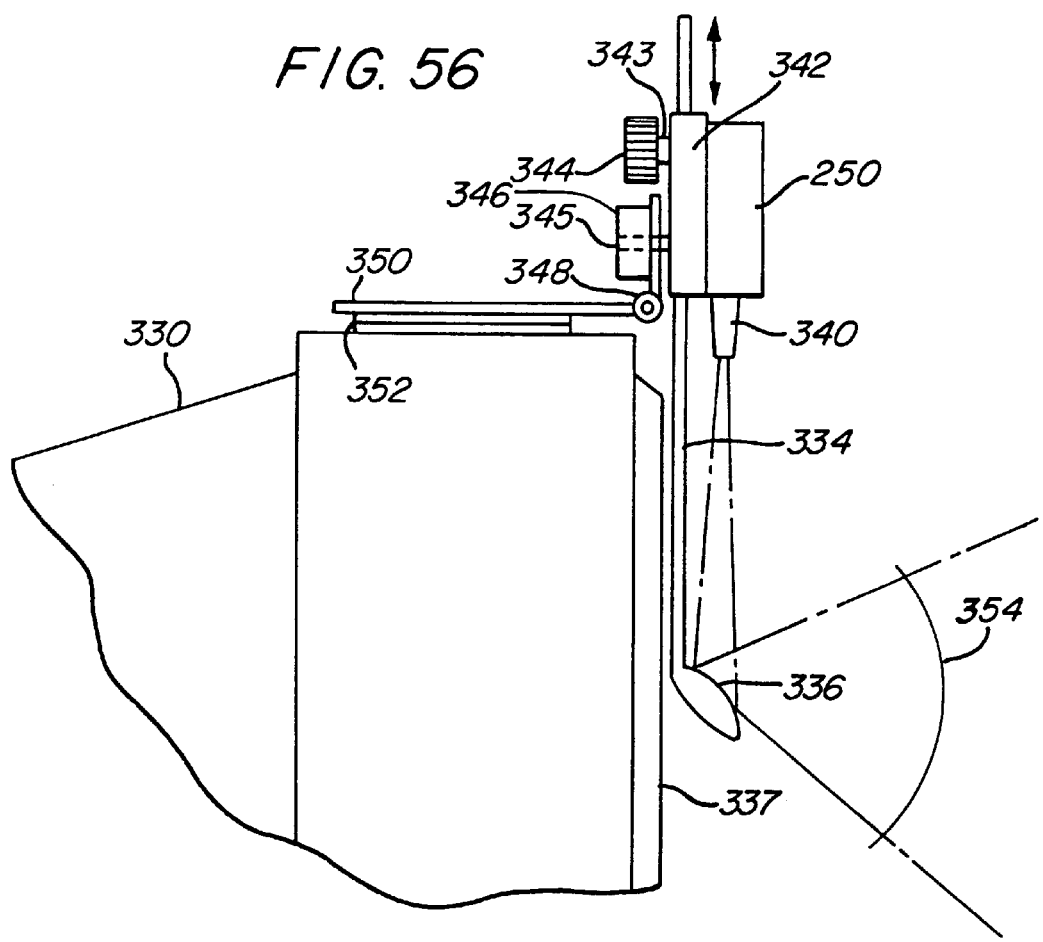
FIG. 56 illustrates a pan/tilt and fold away intersecting beamsplitter.

FIG. 56 offers a detailed apparatus that permits spinning away from the monitor viewing surface 337 and pan and tilt of the camera 250. A micro plate 350 is attached by micro plate hook and loop fasteners 352 to the monitor 330. A micro stiff hinge 348 permits video camera 250 to tilt into various positions. A micro stiff spin hinge 346 on axle 345 permits the transparent suspension rod 334 to spin so that it is not positioned over the monitor viewing surface 337. The transparent extension rod 334 can be positioned up and down by a tension knob 344 with a screw 343 into a rod sleeve 342. The video camera 250 is configured with a micro lens 340 which can capture an expanded area 354 by the expanding wide angle properties of the reflective dimensional area 336. Any distortions from the wide angle perspective can be corrected optically with a custom lens or electronically with image manipulation techniques. Another configuration of the present invention (not shown) glues the reflective dimensional area 336 to the monitor viewing surface 337 thereby eliminating the need for the transparent suspension rod 334. Other embodiments of the present invention can as well be deployed with the configuration of FIGS. 53–56. For example, image blocking as described for FIGS. 41 and 42 are ideally adapted to this present configuration.

Figure 57:
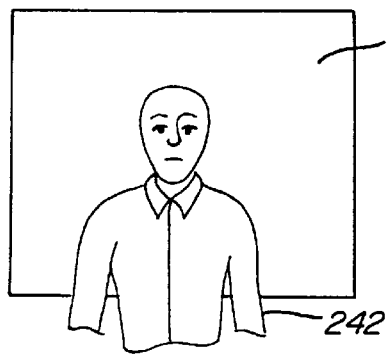
FIG. 57 illustrates a blue screen to add a contrast background.
Figure 58:
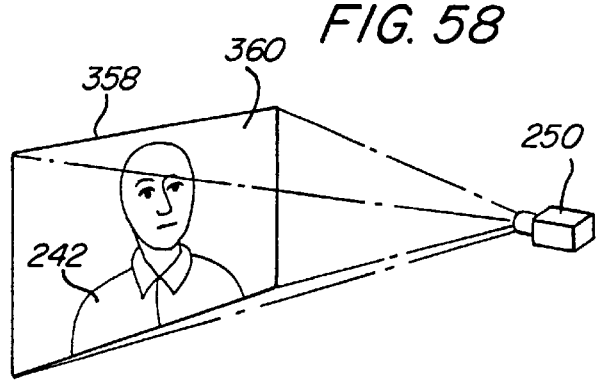
FIG. 58 illustrates pattern recognition and image manipulation to add a contrast background.

To maximize the appearance of the spatial imaged second conferee 242 it is preferred that a black background is utilized (for greater details see specification for FIG. 7). However, conferees may not always tolerate having a black background as decor in their office space. FIG. 57 illustrates the use of a blue/green screen 356 for adding a black background. Not only can a conferee select black, but other generated images for a background. Still, even less obtrusive is the use of pattern recognition to isolate the image of the conferee from the isolated background 360 (FIG. 58) and then process the isolated background 360 with the color black. For simplification, both the blue/green screen 356 and the pattern recognition approach are electronic processing techniques.

Figure 59:
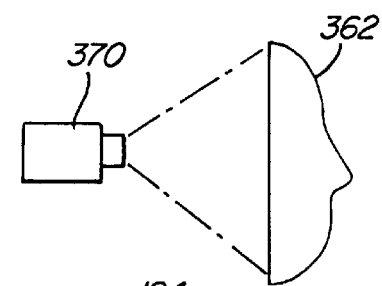
FIG. 59 illustrates a 3-dimensional rear projection convex face screen.

In any and all of the embodiments of the present invention, the spatial imaged second conferee 240 can be produced with various types of dimensional rear projection screens and a rear projector 370. FIG. 59 illustrates a convex three dimensional face screen 362 that will greatly enhance the three dimensional appearance of the spatial imaged second conferee 240.

A significant problem with videoconferencing is that an imaged conferee does not personally engage the observer unless that observer is positioned straight in front of the imaged conferee. The eye contact improvements of the present invention, discussed to this point, permits the observer to have eye contact with the imaged conferee when facing straight on. Typically this is not a problem for, as an example, desktop videoconferencing where the observer is seated straight on to the display. However, in applications such as a public kiosk, as the observer naturally moves from left to right the imaged conferee does not follow the observer by turning in the observer's direction and maintaining eye contact. The following embodiments significantly advance the art of videoconferencing displays that permits natural head and torso movement of the imaged conferee in the direction of the observer's movement.

Figure 60:
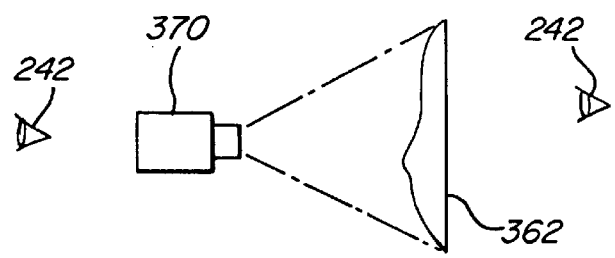
FIG. 60 illustrates a 3-dimensional rear projection concave face screen for the illusion of an imaged head to turn with eye contact through a wide field of view.

FIG. 60 illustrates the use of a concave face screen 364 less than ¼ the actual face depth that will enable the illusion of the spatial imaged second conferee 240 to turn towards the direction of an observer's movement and maintain eye contact within a very wide field of view.

Figure 61:
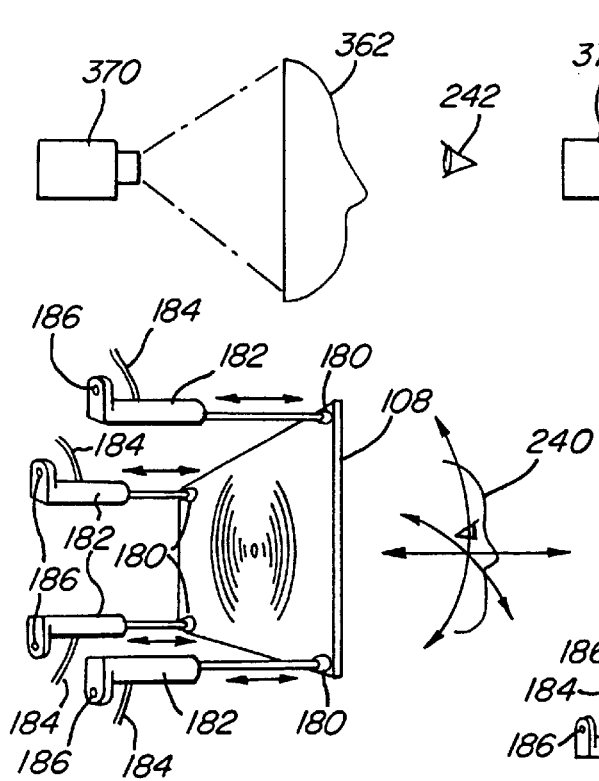
FIG. 61 illustrates the robotic movement of a spatially imaged conferee.

FIG. 61 illustrates the controllable movement of the first fresnel lens 108 as described in FIG. 17. The spatial imaged second conferee 240 can appear to look left, right, up, down, and appear to move closer and further away from the first conferee 242 by the robotic movement of the first fresnel lens 108. Other lenses in the optical pathway may be robotically controlled as well.

Figure 62:
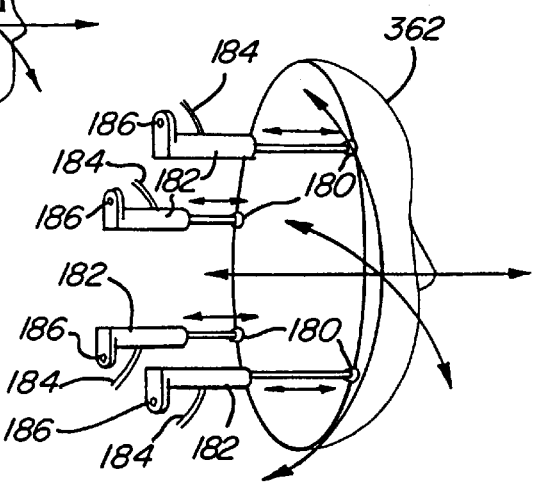
FIG. 62 illustrates a convex rear projection face screen with robotic movement.

The convex three dimensional face screen 362 is illustrated in FIG. 62 with the robotic controls as described for FIG. 17. Here, the spatial imaged second conferee 240 is manipulated right, left, up, down, closer, and further away from the first conferee 242. The three dimensionality of the convex screen added to the spatial imaged second conferee with robotic movements creates a stunning life-like appearance of the spatial imaged second conferee 240.

Figure 63:
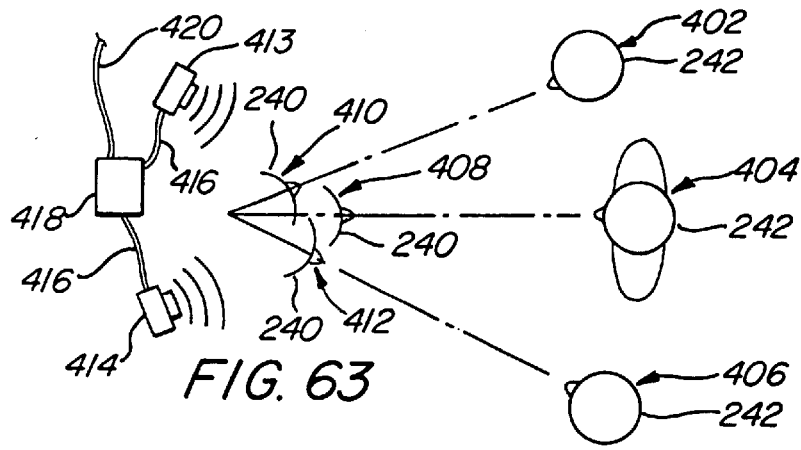
FIG. 63 illustrates tracking of a conferee's movement.

While the concave face screen 364 of FIG. 60 can turn passively by the shape of the concavity, the robotic approaches of FIGS. 61 and 62 require a method of analyzing the position of the first conferee 242 in order to direct the robotics to aim the first fresnel 108 or the convex three dimensional face screen 362 toward the first conferee 242. FIG. 63 illustrates the spatial imaged conferee 240 directed toward the first conferee 242. Positions 404 and 408 correspond between the conferees when straight on. When the first conferee 242 moves to his right into position 402 the spatial imaged conferee 240 accurately follows the first conferee's 242 movement and rests in position 410. Likewise, when the first conferee 242 moves to the left positions 406 and 412 correspond. By accurately tracking the first conferee's 242 movement, eye contact can be maintained throughout the field of view. Several methods of determining the physical location of the first conferee 242 can be deployed, such as infrared, body heat, trigger switches on the floor, microwave, and pattern recognition as described for FIG. 58. Pattern recognition can use even the subtle cue of the reflection in the eye of the first conferee 242 to determine the physical location of the first conferee 242. A first field sensor 414 and a second field sensor 413 are utilized to triangulate the physical location of the first conferee 242. The sensors 413 and 414 are connected to a processing system 418 by a wire 416. The processing system 418 outputs commands through a data output line 420 to the robotic system of FIGS. 61 and 62 (also FIG. 17). Although two sensors are shown, a single sensor will work adequately for many systems that can determine the physical location of the first conferee 242. A manual override of the processing system 418 will allow either conferee to manipulate the robotic system of FIGS. 61 and 62. Tracking systems can as well be developed for multiple conferees for group conferencing situations.

Figure 64:
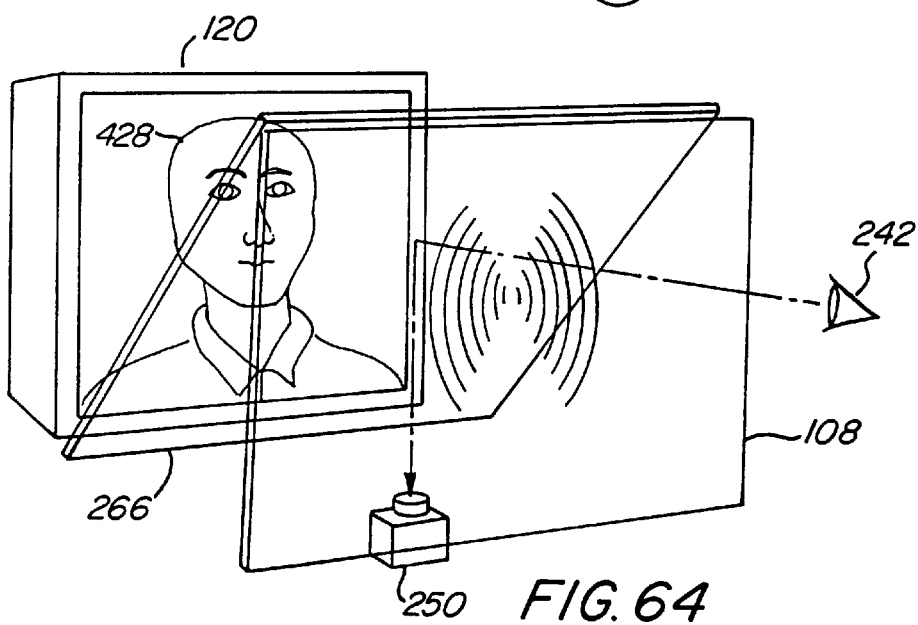
FIG. 64 illustrates a magnified background image conferee.
Figure 65:
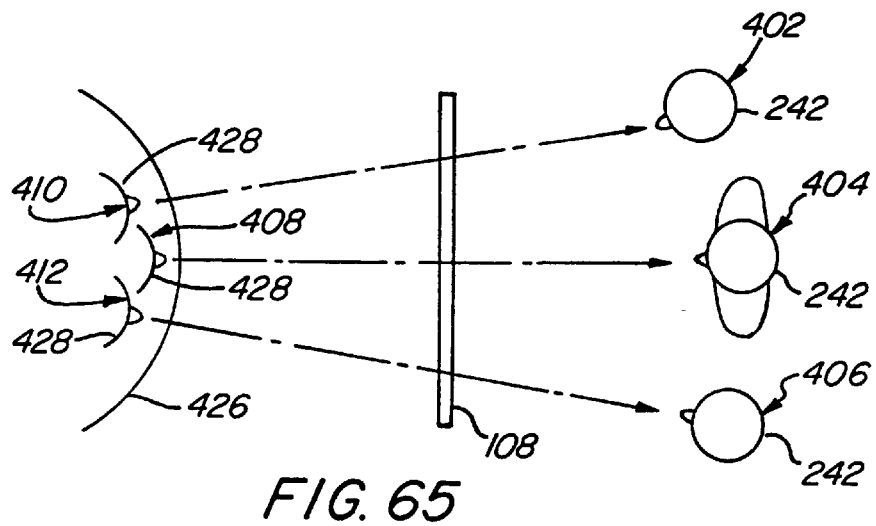
FIG. 65 illustrates conferee movement tracking by the use of a curvature of magnification.

Another significant embodiment of the present invention is illustrated in FIG. 64 which demonstrates a passive method to have a background second conferee 428 to turn and maintain eye contact with the first conferee 242. At times it may be preferable to have the spatial imaged conferee 240 not to be suspended in front of the housing for reasons of privacy. For example, public kiosks that are used for financial transactions, such as videoconferencing bank tellers may be visible to strangers while the first conferee 242 conducts business. In these situations it is preferable to have the spatial imaged second conferee 240 to appear on the background image display 120 which affords greater privacy. The magnification of the first fresnel lens 108 adds a pseudo three dimensional depth, but also creates the illusion of the background second conferee 428 to turn and maintain eye contact with the first conferee 242. FIG. 65 illustrates a curvature of magnification 426 caused by the first fresnel lens 108. As the first conferee 242 looks straight on from the position 404, the background second conferee 428 looks straight on in the position 408. As the first conferee 242 moves to his right to the position 402, the curvature magnification 426 reorients the background second conferee 428 to the position 428 facing with eye contact the first conferee 242. Likewise the position 412 corresponds to the position 406. Accurate turning and maintaining of eye contact is determined through the selection of the fresnel lens and its power and the distance the lens is positioned from the background image display 120. To construct this turning with eye contact embodiment, a full aperture fresnel lens 19 inches by 24 inches (Edmund Scientific part No. 43918) is positioned 22 inches in front of a 21 inch diagonal monitor with the first conferee 242 intended to view the monitor from 30 inches away (not shown). FIG. 64 illustrates the preferred embodiment of the camera 250 capturing an eye contact image of the first conferee 242. Also the additions of spatial objects and the three dimensional face screen 362, as described, will serve to enhance the overall teleconferencing presentation.

All embodiments of the present invention lend themselves to be utilized within a communication network. Not only videoconferencing, but systems controls for kiosks that include on line retrieval and downloading of information is a superb application of a communication network. A dedicated network with a command and control center will allow, for example, banking kiosks to be up-dated regularly with video messages and other digital representation of information. User responses can as well be recorded to assess product interests among numerous other applications.

Image reversal methods to compensate for reflected images can be corrected either optically by adding one or more mirrors or electronically by common image manipulating software and hardware. Although not shown, a mirror can be added to any of the camera pathways of the present invention to correct a single mirror reflection. Also, camera pan and tilt systems that are manual or electronic with remote control features can be added to any embodiment. Also, camera positioning systems that are manual or electronic can be used to move the camera to different areas behind the screen such as when multipoint conferencing. The video camera 250 can, of course, be any type of motion capture camera and may have both analog and digital outputs.

The embodiments of the present invention can also be configured on their side or upside down from what was illustrated in the figures. Modifications will be apparent to one of ordinary skill in the art. Additional components can be integrated as well, such as speakers, microphones, computers, keyboards, lights, and so on. All the configurations of the present invention lend themselves to being utilized as a computer display and a television display.

Antireflective layers can be applied to any optical surface of the configurations to enhance the overall performance of image capturing or image viewing.

As with all eye contact videoconferencing systems, an eye contact terminal sends an eye contact image, but will not receive an eye contact image unless the conferee at the remote terminal has as well an eye contact terminal. Nevertheless, sending an eye contact image will assure quality communication with eye contact is occurring in, at least, one direction. Of course, it is preferred that all conferees have their own eye contact terminal.

In several embodiments of the present invention the images, whether background or spatial, may be reduced in brightness as a result of viewing the images through one or more optical layers such as an antireflective layer and a beamsplitter. This problem can be remedied by using a brighter display source such as a day light viewable liquid crystal display. Another method to increase the brightness of the image is to apply in front of the image a brightness enhancement layer. Various brightness enhancement technologies can be deployed such as holographic films and tiny prismatic arrays which will all effectively increase the image brightness one to five times above normal brightness Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described.

What is claimed is:

1. An improved semireflective transparent panel eye contact teleconferencing terminal for allowing a first conferee to maintain eye contact with a second conferee imaged by the teleconferencing terminal, the terminal comprising:

an image display for presenting an image of the second conferee on a viewing surface;

a semireflective transparent panel positioned in front of the viewing surface creating a covered portion of the viewing surface, the first conferee viewing the viewing surface both directly and through the covered portion; and a video camera disposed to capture a reflection of the first conferee on the semireflective transparent panel.

2. The teleconferencing terminal of claim 1 wherein the image of the second conferee is spatially imaged by a fresnel spatial imaging device, creating a spatially imaged second conferee being suspended in air, and a background image magnified by the fresnel spatial imaging device and viewed by the first conferee through the spatially imaged second conferee.

3. The teleconferencing terminal of claim 1 wherein the semireflective transparent panel is a part of a support housing separate from the image display and is positionable or attachable to the image display.

4. The teleconferencing terminal of claim 1 wherein the semireflective transparent panel is positionable away from the viewing surface by a repositionable connecting means.

5. The teleconferencing terminal of claim 1 wherein image blocking means prevents the video camera from capturing an image of the viewing surface of the image display.

6. The teleconferencing terminal of claim 1 wherein a suspension means of the semireflective transparent panel is positioned in front of the image display.

7. An improved semireflective transparent panel eye contact teleconferencing terminal for allowing a first conferee to maintain eye contact with a second conferee imaged by the teleconferencing terminal, the terminal comprising:

an image display for presenting an image of the second conferee on a viewing surface;

a semireflective transparent panel positioned in front of the viewing surface creating a covered portion of the viewing surface, the first conferee viewing the viewing surface both directly and through the covered portion;

a video camera disposed to capture a reflection of the first conferee on the semireflective transparent panel; and an edge concealment means for concealing one or more edges of the semireflective transparent panel intersecting the viewing surface.

8. The teleconferencing terminal of claim 7 wherein the image of the second conferee is spatially imaged by a fresnel spatial imaging device, creating a spatially imaged second conferee being suspended in air, and a background image magnified by the fresnel spatial imaging device and viewed by the first conferee through the spatially imaged second conferee.

9. The teleconferencing terminal of claim 7 wherein the semireflective transparent panel is a part of a support housing separate from the image display and is positionable or attachable to the image display.

10. The teleconferencing terminal of claim 7 wherein the edge concealment means of the semireflective transparent panel is provided from a grouping of an optically clear substrate with a colorless edge, an angled edge, a rounded edge, a tapered edge, antireflective layers disposed upon a edge, a light absorbing layer disposed between the first conferee and the semireflective transparent panel, and a thin edge created by a stretched plastic film or a chemically hardened glass substrate.

11. An improved semireflective transparent panel eye contact teleconferencing terminal for allowing a first conferee to maintain eye contact with a second conferee imaged by the teleconferencing terminal, the terminal comprising:

an image display for presenting an image of the second conferee on a viewing surface;

a semireflective transparent panel positioned in front of the viewing surface creating a covered portion of the viewing surface, the first conferee viewing the viewing surface both directly and through the covered portion;

a video camera disposed to capture a reflection of the first conferee on the semireflective transparent panel; and a semireflective transparent panel concealment means to, at least partially, conceal the panel when viewed against the viewing surface.

12. The teleconferencing terminal of claim 11 wherein the image of the second conferee is spatially imaged by a fresnel spatial imaging device, creating a spatially imaged second conferee being suspended in air, and a background image magnified by the fresnel spatial imaging device and viewed by the first conferee through the spatially imaged second conferee.

13. The teleconferencing terminal of claim 11 wherein the semireflective transparent panel is a part of a support housing separate from the image display and is positionable or attachable to the image display.

14. The teleconferencing terminal of claim 11 wherein the semireflective transparent panel concealment means is selected from the group consisting of a light absorbing layer disposed over an uncovered portion of the image display, a light absorbing layer disposed between the first conferee and the semireflective transparent panel, chromaticity matching between the covered and uncovered portions, and an image manipulation means for manipulating an image viewed on the viewing surface and matching the appearance between the uncovered portion and the covered portions.

15. An improved semireflective transparent panel eye contact teleconferencing terminal for allowing a first conferee to maintain eye contact with a second conferee imaged by the teleconferencing terminal, the terminal comprising:

an image display for presenting an image of the second conferee on a viewing surface;

a semireflective transparent panel positioned in front of the viewing surface creating a covered portion of the viewing surface, the first conferee viewing the viewing surface both directly and through the covered portion;

a video camera disposed to capture a reflection of the first conferee on the semireflective transparent panel; and a dimensionally shaped area of the semireflective transparent panel for expanding the reflection of the first conferee and thereby substantially reducing the size of the semireflective transparent panel.

16. The teleconferencing terminal of claim 15 wherein the image of the second conferee is spatially imaged by a fresnel spatial imaging device, creating a spatially imaged second conferee being suspended in air, and a background image magnified by the fresnel spatial imaging device and viewed by the first conferee through the spatially imaged second conferee.

17. The teleconferencing terminal of claim 15 wherein the semireflective transparent panel is a part of a support housing separate from the image display and is positionable or attachable to the image display.

18. The teleconferencing terminal of claim 15 wherein the semireflective transparent panel is positionable away from the viewing surface by a repositionable connecting means.

19. The teleconferencing terminal of claim 15 wherein image blocking means prevents the video camera from capturing an image of the viewing surface of the image display.

20. The teleconferencing terminal of claim 15 wherein distortions caused to the reflection of the first conferee by the dimensionally shaped area of the semireflective transparent panel are corrected optically or electronically.

21. The teleconferencing terminal of claim 15 wherein a suspension means of the semireflective transparent panel is positioned in front of the image display.

22. An improved eye contact teleconferencing terminal for allowing a first conferee to maintain eye contact with a second conferee spatially imaged with the appearance of being suspended in air by the teleconferencing terminal, the terminal comprising:

an image display for producing an image of the second conferee;

a spatial image device for creating from the image of the second conferee a spatially imaged second conferee; and a video camera disposed, on an alignment axis, behind the spatially imaged second conferee, to capture an image of the first conferee through the spatially imaged second conferee while the first conferee views the spatially imaged second conferee, wherein the spatially imaged second conferee follows and maintains eye contact with the first conferee while moving in a field of view of the spatially imaged second conferee, the following and maintaining of eye contact by the spatially imaged second conferee is selected from the group consisting of a robotic control of the image display by a sensor system locating the physical presence of the first conferee, a robotic control of the spatial imaging device by a sensor system locating the physical presence of the first conferee, and a concave face screen.

23. An improved eye contact teleconferencing terminal for allowing a first conferee to maintain eye contact with a second conferee spatially imaged with the appearance of being suspended in air by the teleconferencing terminal, the terminal comprising:

an image display for producing an image of the second conferee;

a fresnel lens spatial image device for creating from the image of the second conferee a spatially imaged second conferee; and a video camera disposed, on an alignment axis, behind the spatially imaged second conferee and a fresnel lens, to capture an image of the first conferee through the spatially imaged second conferee and the fresnel lens while the first conferee views the spatially imaged second conferee, wherein the spatially imaged second conferee follows and maintains eye contact with the first conferee while moving in a field of view of the spatially imaged second conferee, the following and maintaining of eye contact by the spatially imaged second conferee is selected from the group consisting of a robotic control of the image display by a sensor system locating the physical presence of the first conferee, a robotic control of the spatial imaging device by a sensor system locating the physical presence of the first conferee, and a concave face screen.

\* \* \* \* \*